United States Patent
Hoshina et al.

(10) Patent No.: US 10,355,318 B2
(45) Date of Patent: Jul. 16, 2019

(54) ACTIVE MATERIAL, NONAQUEOUS ELECTROLYTE BATTERY, BATTERY PACK AND VEHICLE

(71) Applicant: KABUSHIKI KAISHA TOSHIBA, Minato-ku (JP)

(72) Inventors: Keigo Hoshina, Kashiwazaki (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 3 days.

(21) Appl. No.: 15/392,828

(22) Filed: Dec. 28, 2016

(65) Prior Publication Data

US 2017/0271719 A1    Sep. 21, 2017

(30) Foreign Application Priority Data

Mar. 16, 2016  (JP) ................. 2016-052836

(51) Int. Cl.
*H01M 10/42* (2006.01)
*H01M 2/30* (2006.01)
(Continued)

(52) U.S. Cl.
CPC .......... *H01M 10/425* (2013.01); *C01G 23/04* (2013.01); *H01M 2/305* (2013.01); *H01M 4/485* (2013.01); *H01M 10/0525* (2013.01); *H01M 10/44* (2013.01); *H01M 4/505* (2013.01); *H01M 4/525* (2013.01); *H01M 4/5825* (2013.01); *H01M 2220/20* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

2006/0222950 A1   10/2006   Koshina
2009/0253028 A1*  10/2009   Takagi ............... B60L 11/1874
                                                429/62
(Continued)

FOREIGN PATENT DOCUMENTS

EP    3 051 612 A1    8/2016
JP    2006-286599     10/2006
(Continued)

OTHER PUBLICATIONS

Nakagawa et al. (WO 2017073765) (a raw machine translation) (Abstract, Detailed Description & Claims) (May 4, 2017).*

(Continued)

*Primary Examiner* — Carmen V Lyles-Irving
(74) *Attorney, Agent, or Firm* — Oblon, McClelland, Maier & Neustadt, L.L.P.

(57) ABSTRACT

According to one embodiment, there is provided an active material includes particles of a Na-containing niobium titanium composite oxide having an orthorhombic crystal structure. A peak intensity $I_1$ of a strongest peak $P_1$ within a range of 3350 to 3450 $cm^{-1}$ is 1.6 or less in an infrared diffuse reflectivity spectrum of a surface of the particles, according to a diffuse reflectance Fourier transform spectrometry measurement.

13 Claims, 5 Drawing Sheets

(51) Int. Cl.
  *H01M 4/485* (2010.01)
  *H01M 10/44* (2006.01)
  *C01G 23/04* (2006.01)
  *H01M 10/0525* (2010.01)
  *H01M 4/505* (2010.01)
  *H01M 4/525* (2010.01)
  *H01M 4/58* (2010.01)

(56) References Cited

U.S. PATENT DOCUMENTS

| 2012/0045693 | A1 | 2/2012 | Eom |
| 2013/0189584 | A1 | 7/2013 | Inagaki et al. |
| 2014/0147739 | A1* | 5/2014 | Nakagawa ............ H01M 4/131 429/188 |
| 2015/0079438 | A1 | 3/2015 | Inagaki et al. |
| 2015/0129797 | A1 | 5/2015 | Ise et al. |
| 2016/0087276 | A1 | 3/2016 | Inagaki et al. |
| 2016/0141615 | A1 | 5/2016 | Nakayama et al. |
| 2016/0226067 | A1 | 8/2016 | Harada et al. |

FOREIGN PATENT DOCUMENTS

| JP | 2012-43765 | 3/2012 |
| JP | 2013-149486 | 8/2013 |
| JP | 2014-209443 | 11/2014 |
| JP | 2015-60713 | 3/2015 |
| JP | 2015-111550 | 6/2015 |
| WO | WO 2015/019922 A1 | 2/2015 |

OTHER PUBLICATIONS

Nakagawa et al. (WO 2017073765) (Table 1) (May 4, 2017).*
Extended European Search Report dated Apr. 21, 2017 in Patent Application No. 17154356.4.
J-F. Colin et al., "A Novel Layered Titanoniobate $LiTiNbO_5$: Topotactic Synthesis and Electrochemistry versus Lithium", Inorganic Chemistry, vol. 45, No. 18. XP055363464, 2006, pp. 7217-7223.

* cited by examiner

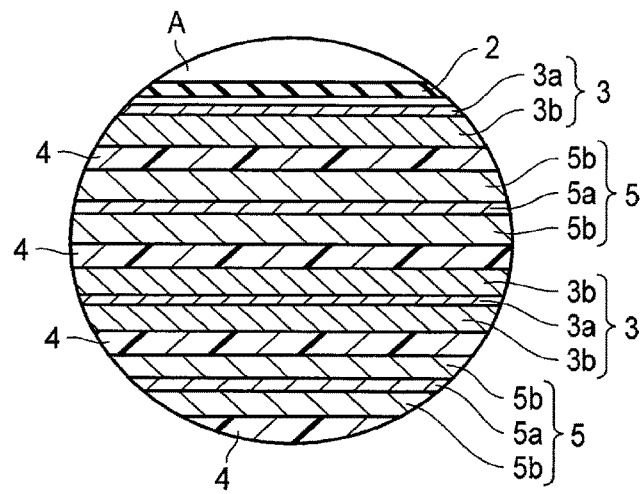
F I G. 3
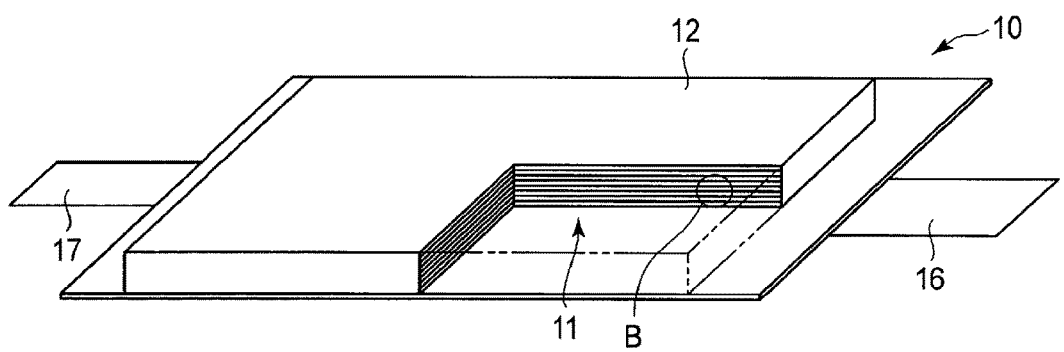
F I G. 4

ACTIVE MATERIAL, NONAQUEOUS ELECTROLYTE BATTERY, BATTERY PACK AND VEHICLE

CROSS-REFERENCE TO RELATED APPLICATIONS

This application is based upon and claims the benefit of priority from the Japanese Patent Application No. 2016-052836, filed Mar. 16, 2016, the entire contents of which are incorporated herein by reference.

FIELD

Embodiments described herein relate generally to an active material, a nonaqueous electrolyte battery, a battery pack, and a vehicle.

BACKGROUND

A nonaqueous electrolyte battery, in which a charge and discharge are performed by migration of lithium ions between a negative electrode and a positive electrode, has been actively researched as a high energy density battery.

In addition to the use as a power supply for small electronic devices, the nonaqueous electrolyte battery is expected to be utilized also as a medium to large power source, such as for in-vehicle applications and stationary applications. The nonaqueous electrolyte battery is required to have cycle life characteristics and high stability in such medium to large size applications. The nonaqueous electrolyte battery is further required to have high input-and-output characteristics.

Examples of nonaqueous electrolyte batteries having excellent cycle life characteristics and high stability include a nonaqueous electrolyte battery in which a lithium titanate having a spinel structure is used in a negative electrode. However, since the lithium titanate having the spinel structure has a high lithium insertion-and-extraction potential of approximately 1.55 V (vs. Li/Li$^+$), a battery voltage of a nonaqueous electrolyte battery using the lithium titanate having the spinel structure in a negative electrode is low. Further, since the lithium titanate having the spinel structure exhibits flat charge and discharge curves in the lithium insertion-and-extraction potential ranges, the lithium titanate having the spinel structure has such a feature that a change in potential accompanying a change in state-of-charge is very small.

BRIEF DESCRIPTION OF THE DRAWINGS

FIG. 3 is an enlarged cross-sectional view of an A portion in FIG. 2;

FIG. 4 is a partially cutaway perspective view schematically showing another example of a nonaqueous electrolyte battery according to the second embodiment;

DETAILED DESCRIPTION

Figure 1:
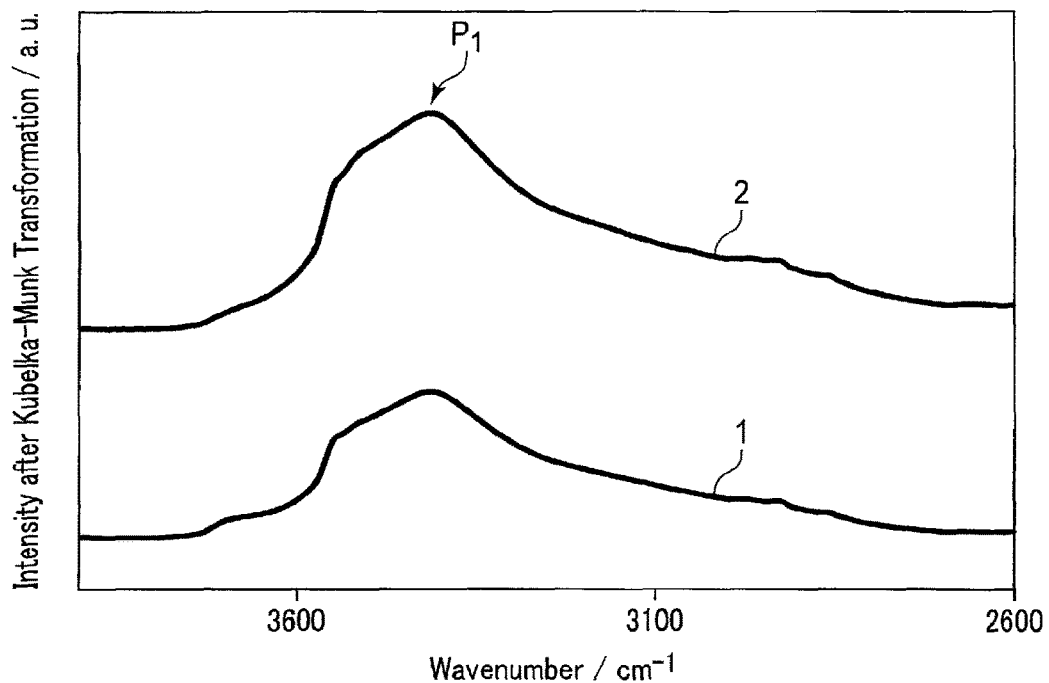
FIG. 1 is one example of an infrared diffuse reflectivity spectrum of surfaces of particles of a Na-containing niobium titanium composite oxide included in each of an active material as one example of a first embodiment and an active material of a reference example.

In general, according to one embodiment, there is provided an active material includes particles of a Na-containing niobium titanium composite oxide having an orthorhombic crystal structure. A peak intensity $I_1$ of a strongest peak $P_1$ within a range of 3350 to 3450 cm$^{-1}$ is 1.6 or less in an infrared diffuse reflectivity spectrum of a surface of the particles, according to a diffuse reflectance Fourier transform spectrometry measurement.

According to the embodiment, there is provided a nonaqueous electrolyte battery. The nonaqueous electrolyte battery includes a positive electrode, a negative electrode, and nonaqueous electrolyte. The negative electrode includes the active material according to the embodiment.

According to the embodiment, there is provided a battery pack. The battery pack includes the nonaqueous electrolyte battery according to the embodiment.

According to the embodiment, there is provided a vehicle. The vehicle includes the battery pack according to the embodiment.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

First Embodiment

According to a first embodiment, there is provided an active material includes particles of a Na-containing niobium titanium composite oxide having an orthorhombic crystal structure. In an infrared diffuse reflectivity spectrum of a surface of the particles, a peak intensity of a strongest peak $P_1$ within a range of 3350 to 3450 cm$^{-1}$ is 1.6 or less. The infrared diffuse reflectivity spectrum is measured by a diffuse reflectance Fourier transform spectrometry measurement.

The active material according to the first embodiment can be used as an active material for a battery, for example.

A Na-containing niobium titanium composite oxide having an orthorhombic crystal structure which is contained in the active material according to the first embodiment can be exhibit an average operating potential of 1.2 to 1.4 V (vs. Li/Li$^+$). Among titanium composite oxides, this operating potential is a low value. Thus, the active material according to the first embodiment including the orthorhombic Na-containing niobium titanium composite oxide can achieve a nonaqueous electrolyte battery which can exhibit a high battery voltage.

The orthorhombic Na-containing niobium titanium composite oxide contained in the active material according to the first embodiment can exhibit charge and discharge curves in which a change in potential accompanying a change in state-of-charge is large in the operating potential range. Thus, in the orthorhombic Na-containing niobium titanium composite oxide, the state-of-charge can be easily grasped based on a potential.

As compared with an orthorhombic Na-containing titanium composite oxide $Li_2Na_2Ti_6O_{14}$ exhibiting a reversible capacity of only approximately 90 mAh/g during charge and discharge within a potential range of 1.0 to 3.0 V (vs. $Li/Li^+$), the Na-containing niobium titanium composite oxide having the orthorhombic crystal structure can exhibit high reversible capacity during charge and discharge in a similar potential range. However, as a result of intensive studies, it has been found that it is difficult for the Na-containing niobium titanium composite oxide having the orthorhombic crystal structure to achieve higher capacity.

On the other hand, although the active material according to the first embodiment includes the Na-containing niobium titanium composite oxide having the orthorhombic crystal structure, the active material can achieve a nonaqueous electrolyte battery which can exhibit a high reversible capacity, as described below.

First, in an infrared diffuse reflectivity spectrum obtained by the diffuse reflectance Fourier transform infrared spectrometry (diffuse reflectance FT-IR) measurement for a surface of particles of the Na-containing niobium titanium composite oxide having the orthorhombic crystal structure, a strongest peak $P_1$ within a range of 3350 to 3450 $cm^{-1}$ is considered to be a peak derived from a hydroxyl group. Even if hydroxide is not used as a raw material when the Na-containing niobium titanium composite oxide is synthesized, the hydroxyl group is present on the surface of the particles of the Na-containing niobium titanium composite oxide due to, for example, reaction with moisture contained in the air atmosphere.

The active material according to the first embodiment in which a peak intensity $I_1$ of the strongest peak $P_1$ is 1.6 or less can restrain a side reaction with a nonaqueous electrolyte. It is considered that this is because the presence of a compound having a hydroxyl group easily causing the side reaction with the nonaqueous electrolyte is satisfactorily reduced.

A side reaction between an active material and a nonaqueous electrolyte increases film-resistance of the active material. Thus, as the side reaction with the nonaqueous electrolyte occurs more often, the film-resistance of the active material becomes higher. In the active material, the film resistance increases, so that an inactive portion is provided, whereby a capacity lower than a theoretical capacity is exhibited. On the other hand, since the active material according to the first embodiment can restrain the side reaction with a nonaqueous electrolyte, a high reversible capacity can be exhibited.

On the other hand, when the peak intensity $I_1$ of the strongest peak $P_1$ is more than 1.6, a hydroxyl group is excessively present on the surface of the particles of the Na-containing niobium titanium composite oxide. In an active material including such a Na-containing niobium titanium composite oxide, a side reaction between the a surface of the particles of the Na-containing niobium titanium composite oxide and an electrolyte easily occurs, so that charge and discharge reactions is less likely to progress.

The peak intensity $I_1$ of the strongest peak $P_1$ within the range of 3350 to 3450 $cm^{-1}$ in the diffuse reflectance FT-IR spectrum of the surface is preferably within a range of $1 \leq I_1 \leq 1.6$. An active material including the particles of the Na-containing niobium titanium composite oxide having the strongest peak $P_1$ with such an FT-IR spectrum of the surface can achieve higher reversible capacity. It is considered that this is because when the peak intensity $I_1$ of the strongest peak $P_1$ is within the above range, the particles of the Na-containing niobium titanium composite oxide are particles in which grain growth due to excessive firing is suppressed, and, at the same time, generation of impurities on the surface can be reduced. The peak intensity $I_1$ of the strongest peak $P_1$ is more preferably within a range of $1.2 \leq I_1 \leq 1.5$.

In a lithium titanate and a monoclinic titanium dioxide, the dependency of the reversible capacity on the peak intensity $I_1$ of the strongest peak $P_1$ within the range of 3350 to 3450 $cm^{-1}$ in the diffuse reflectance FT-IR spectrum of a surface is low, or the reversible capacity does not depend on the peak intensity $I_1$ of the strongest peak $P_1$. This fact will be verified by the following Comparative Examples 6 to 8. Accordingly, the effect of achieving high reversible capacity due to the intensity of the strongest peak $P_1$ in the infrared diffuse reflectivity spectrum of a surface being 1.6 or less is peculiar to the particles of the Na-containing niobium titanium composite oxide having the orthorhombic crystal structure.

In the infrared diffuse reflectivity spectrum obtained by the diffuse reflectance FT-IR measurement for the surface of the particles of the Na-containing niobium titanium composite oxide having the orthorhombic crystal structure, a peak intensity $I_2$ of a strongest peak $P_2$ within a range of 1410 to 1460 $cm^{-1}$ is preferably within a range of $6 \leq I_2 \leq 10$.

The strongest peak $P_2$ within the range of 1410 to 1460 $cm^{-1}$ in the infrared diffuse reflectivity spectrum obtained by the diffuse reflectance FT-IR measurement is considered to be a peak derived from a carbonate. As the carbonate, materials derived from raw materials may be used, and it is inferred that the carbonate can be produced by reaction of carbon dioxide in the air atmosphere with lithium or sodium that can be present on a surface of orthorhombic Na-containing niobium titanium composite oxide when a composite oxide is synthesized. Thus, the strongest peak $P_2$ can be present in the infrared diffuse reflectivity spectrum for a surface of the Na-containing niobium composite oxide synthesized without using carbonate.

When the peak intensity $I_2$ of the strongest peak $P_2$ is within this range, in the Na-containing niobium titanium composite oxide, a deficiency of sodium in particles is suppressed, and, at the same time, the Na-containing niobium titanium composite oxide is in such a state that presence of carbonate as an impurity is satisfactorily reduced. As a result, in an active material including the particles of the Na-containing niobium titanium composite oxide showing such a strongest peak $P_2$ in FT-IR spectrum for the surface, a charge reaction easily progresses, and the active material can exhibit a higher reversible capacity.

Here, a spectrum obtained by a diffuse reflectance Fourier transform infrared spectrometry (diffuse reflectance FT-IR) measurement will be described.

The diffuse reflectance FT-IR measurement was performed while circulating nitrogen at 50 mL/min. As a light source, a globar (silicon carbide) is used, and as a detector, DTGS (Deuterium Tri-Glycine Sulfate) is used. As a reference, an Au evaporated film is used.

The spectrum obtained by the diffuse reflectance FT-IR measurement is converted by virtue of a Kubelka-Munk function.

The Kubelka-Munk function used here is given by $f(R)=(1-R)^2/2R$ when a relative diffuse reflectance of a sample is R. In the case where the relative diffuse reflectance is a relative reflectance with respect to a reference of an Au evaporated film, the relative diffuse reflectance R is obtained by (infrared light intensity of a sample)/(infrared light intensity of the Au evaporated film). The infrared light intensity of the sample is the infrared light intensity detected by a detector when the sample is placed on a sample stage. Similarly, the infrared light intensity of the Au evaporated film is the infrared light intensity detected by the detector when the Au evaporated film is placed on the sample stage.

The following operation is performed on the spectrum thus subjected to Kubelka-Munk conversion.

First, a straight base line is drawn at a wave number of 3800 to 2700 cm$^{-1}$. For the strongest peak $P_1$ within the range of 3350 to 3450 cm$^{-1}$, a height from the base line to a peak top of the strongest peak $P_1$ is taken to be the intensity $I_1$.

On the other hand, it is difficult for the strongest peak $P_2$ within the range of 1410 to 1460 cm$^{-1}$ to draw the base line in a spectrum measured at room temperature. Thus, the temperature is first raised to 600° C. and then the spectrum is obtained. The spectrum obtained here is taken to be background. Next, the background is subtracted from the spectrum measured at room temperature, and in the spectrum thus obtained, a straight base line is drawn at a wave number of 1655 to 1350 cm$^{-1}$. A height from this base line to a peak top of the strongest peak $P_2$ is taken to be the intensity $I_2$.

Thus, in the infrared diffuse reflectivity spectrum, the peak intensity $I_1$ of the strongest peak $P_1$ within the range of 3350 to 3450 cm$^{-1}$ and the peak intensity $I_2$ of the strongest peak $P_2$ within the range of 1410 to 1460 cm$^{-1}$ can be obtained.

Next, the active material according to the first embodiment will be described in more detail.

The active material according to the first embodiment includes particles of a Na-containing niobium titanium composite oxide having an orthorhombic crystal structure.

The Na-containing niobium titanium composite oxide can be represented by a general formula of $Li_{2+v}Na_{2-w}M1_x Ti_{6-y-z}Nb_yM2_zO_{14+\delta}$, for example.

In the general formula of $Li_{2+v}Na_{2-w}M1_x Ti_{6-y-z}Nb_yM2_zO_{14+\delta}$, the subscript v can take values within a range of $0 \leq v \leq 0.2$. In a composite oxide incorporated in a battery, the subscript v in the general formula can take values in a range of $0 \leq v \leq 4$ depending on a state-of-charge of the composite oxide.

In the general formula, the subscript w corresponds to the amount of Na included in the orthorhombic Na-containing niobium titanium composite oxide. The lithium insertion-and-extraction potential of the orthorhombic Na-containing niobium titanium composite oxide can be adjusted by, for example, the amount of Na in the composite oxide. The subscript w can have a value within a range of, for example, $0<w<2$. The subscript w preferably has a value within a range from 0.1 to 1.

In the general formula, the subscript x corresponds to the amount of the metallic element M1 included in the orthorhombic Na-containing niobium titanium composite oxide. The metallic element M1 may be at least one metallic element selected from the group consisting of Cs, K, Mg, Sr, Ba, and Ca. The metallic element M1 can be one metallic element. Alternatively, the metallic element M1 can include two or more metallic elements. The subscript x can has a value within a range of, for example, $0 \leq x<2$. Thus, the orthorhombic Na-containing niobium titanium composite oxide may not include the metallic element M1. The subscript x preferably has a value within a range from 0.05 to 0.2.

In an aspect, the metallic element M1 includes Cs. When Cs is included, a more excellent cycle performance can be achieved. In another aspect, the metallic element M1 includes K. When K is included, a more excellent cycle performance can be achieved. In another aspect, the metallic element M1 includes Mg. When Mg is included, a more excellent rate performance can be achieved. In another aspect, the metallic element M1 includes Sr. When Sr is included, a more excellent rate performance can be achieved. In another aspect, the metallic element M1 includes Ba. When Ba is included, a more excellent rate performance can be achieved. In another aspect, the metallic element M1 includes Ca. When Ca is included, a more excellent rate performance can be achieved. The metallic element M1 preferably includes at least one of Sr and Ba.

In the general formula, the subscript y corresponds to the amount of niobium included in the orthorhombic Na-containing niobium titanium composite oxide. The subscript y can have a value within a range of, for example, $0<y<6$. The subscript y preferably has a value within the range from 0.1 to 1.

In the general formula, the subscript z corresponds to the amount of the metallic element M2 included in the orthorhombic Na-containing niobium titanium composite oxide. The metallic element M2 may be at least one metallic element selected from the group consisting of Zr, Sn, V, Ta, Mo, W, Fe, Co, Mn, and Al. The metallic element M2 can be one metallic element. Alternatively, the metallic element M2 can include two or more metallic elements. The subscript z can have a value within the range of, for example, $0 \leq z<3$. Thus, the orthorhombic Na-containing niobium titanium composite oxide may not include the metallic element M2. The subscript z preferably has a value within a range from 0.1 to 0.3.

In an aspect, the metallic element M2 includes Zr. When Zr is included, a more excellent cycle performance can be achieved. In another aspect, the metallic element M2 includes Sn. When Sn is included, a more excellent rate performance can be achieved. In another aspect, the metallic element M2 includes V. V can exhibit the same physical and chemical properties as those of Nb. In another aspect, the metallic element M2 includes Ta. Ta can exhibit the same physical and chemical properties as those of Nb. In another aspect, the metallic element M2 includes Mo. When Mo is included, a more excellent rate performance can be achieved. In another aspect, the metallic element M2 includes W. When W is included, a more excellent rate performance can be achieved. In another aspect, the metallic element M2 includes Fe. When Fe is included, a more excellent cycle performance can be achieved. In another aspect, the metallic element M2 includes Co. When Co is included, a more excellent cycle performance can be achieved. In another aspect, the metallic element M2 includes Mn. When Mn is included, a more excellent cycle performance can be achieved. In another aspect, the metallic element M2 includes Al. When Al is included, a more excellent rate performance can be achieved. The metallic element M2 preferably includes at least one selected from the group consisting of Al, Zr, Sn and V.

The subscript $\delta$ may correspond to a deviation of the amount of oxygen from the orthorhombic Na-containing niobium titanium composite oxide that can be represented by the general formula of $Li_{2+v}Na_{2-w}M1_x Ti_{6-y-z}Nb_yM2_zO_{14}$. A negative value of the subscript $\delta$ may mean that oxygen is less than the stoichiometric ratio. On the other hand, a positive value of the subscript $\delta$ may mean that oxygen is more than the stoichiometric ratio. It is difficult for composite oxide for which the value of the subscript δ exceeds the range of −0.5≤δ≤0.5 to establish a balance between the rate and cycle characteristics. The subscript δ preferably has a value within a range of −0.1≤δ≤0.1.

The active material according to the first embodiment may contain an orthorhombic Na-containing niobium titanium composite oxide other than composite oxides that can be represented by the general formula $Li_{2+v}Na_{2-w}M1_xTi_{6-y-z}Nb_yM2_zO_{14}$. Examples of such composite oxides include an orthorhombic Na-containing niobium titanium composite oxide in which a Li content per 1 mol is less than 2 mols, such as $Li_{1.9}Na_{1.6}Ti_{5.5}Nb_{0.5}O_{14}$.

When the orthorhombic Na-containing niobium titanium composite oxide includes Li, it can be considered that in particles of the orthorhombic Na-containing niobium titanium composite oxide in which the peak intensity $I_2$ of the strongest peak $P_2$ in the infrared diffuse reflectivity spectrum for a surface is within the range of $6≤I_2≤10$, a deficiency of Li is satisfactorily suppressed in addition to the suppression of a deficiency of Na as described above, and, at the same time, the Na-containing niobium titanium composite oxide is in such a state that presence of carbonate as an impurity is satisfactorily suppressed.

The active material according to the first embodiment may include one kind of orthorhombic Na-containing niobium titanium composite oxide, or two or more kinds of orthorhombic Na-containing niobium titanium composite oxide.

The particles included in the active material according to the first embodiment may be in the form of primary particles or in the form of secondary particles as agglomerates of primary particles. An average primary particle size is preferably from 0.1 μm to 5 μm. When the active material according to the first embodiment includes secondary particles, an average secondary particle size is preferably from 5 μm to 20 μm. The particle size can be obtained by the laser particle size distribution measurement.

The particles includes in the active material according to the first embodiment preferably have a specific surface area of from 0.5 $m^2$/g to 30 $m^2$/g.

[Production Method]

The active material according to the first embodiment can be produced by a solid-state method to be hereinafter described by referring to examples. However, the active material according to the first embodiment can also be produced by a wet method, such as a hydrothermal method, a sol-gel method, and a coprecipitation method, in place of the solid-state method. In wet synthesis, fine particles are easily obtained.

Hereinafter, an example of a method of synthesizing the active material according to the first embodiment with the use of the solid-state method will be described.

First, among a Ti source, a Li source, a Na source, a Nb source, a metal element M1 source, and a metal element M2 source, the necessary raw material is provided in accordance with the target composition of the orthorhombic Na-containing niobium titanium composite oxide to be included in the active material. These raw materials may be compound such as an oxides or salts, for example. The above salt is preferably a salt decomposed at relatively low temperature to produce an oxide, such as carbonate or nitrate.

Next, the provided raw materials are mixed at an appropriate stoichiometric ratio, thus obtaining a mixture. For example, when orthorhombic Na-containing niobium titanium composite oxide represented by a composition formula of $Li_2Na_{1.7}Ti_{5.7}Nb_{0.3}O_{14}$ is to be synthesized, $TiO_2$, LiOH, NaOH, and $Nb(OH)_5$ are mixed such that a molar ratio Li:Na:Ti:Nb in the mixture is 2:1.7:5.7:0.3.

In the mixing, the raw materials are satisfactorily ground and mixed. When the raw materials are ground and mixed, the raw materials easily react with each other in the subsequent heat treatment, and formation of impurities can be reduced during a synthesis of a composite oxide. Li and Na may be mixed in an amount larger than a predetermined amount. Lithium and sodium are easily evaporated if the synthesis temperature is raised to allow the raw materials to be satisfactorily reacted, and deficiencies thereof are likely to occur. In particular, since Li may be lost during heat treatment, Li may be added in an amount larger than the predetermined amount. If lithium and sodium are added at a molar ratio more than a predetermined molar ratio in consideration of the evaporation, surface impurities are likely to be formed. However, when the raw materials are satisfactorily ground, even if lithium and sodium are included in the mixture at a molar ratio more than a predetermined molar ratio, formation of surface impurities can be reduced as described above.

Next, the mixture of the raw materials is subjected to a first heat treatment at a temperature of from 800° C. to 1000° C. for from 1 hour to 24 hours in the air atmosphere. Satisfactory crystallization is less likely to be obtained at a temperature lower than 800° C. On the other hand, when the temperature exceeds 1000° C., grain growth is excessively advanced, so that coarse particles are formed, and thus it is not preferable. Similarly, if the first heat treatment time is less than 1 hour, satisfactory crystallization is less likely to be obtained. If the first heat treatment time is more than 24 hours, grain growth is excessively advanced, so that coarse particles are formed, and thus it is not preferable. It is preferable that the mixture is heat treated at a temperature of from 850° C. to 950° C. for from 2 hours to 5 hours. When orthorhombic Na-containing niobium titanium composite oxide represented by a composition formula of $Li_2Na_{1.7}Ti_{5.7}Nb_{0.3}O_{14}$ is synthesized, the first heat treatment is performed at 900° C. for 3 hours, for example.

Next, a product obtained by the first heat treatment described above is subjected to a ball mill grinding in water or a mixture of water and alcohol. By virtue of this ball mill grinding, impurities remaining on a surface of the product can be removed. For example, hydroxide or carbonate of lithium or sodium that may be produced at a grain boundary or on a particle surface of the product obtained by the first heat treatment can be reduced by such grinding in an aqueous solution.

Subsequently, the ground product is subjected to a second heat treatment. The temperature of the second heat treatment is preferably from 500° C. to 900° C. If the temperature is less than 500° C., the crystallinity on a particle surface may be lowered, and if the temperature is more than 900° C., grain growth is concerned. The temperature of the second heat treatment is more preferably from 600° C. to 800° C. The second heat treatment may be performed in the air atmosphere or an atmosphere in which the fraction of oxygen or nitrogen is increased as compared with the air atmosphere.

For example, according to the above-described method, there can be obtained an active material including particles of a Na-containing niobium titanium composite oxide, and in the infrared diffuse reflectivity spectrum obtained by the diffuse reflectance infrared Fourier transform spectrometry measurement for a surface of the particles, the peak intensity $I_1$ of the strongest peak $P_1$ within the range of 3350 to 3450 $cm^{-1}$ is 1.6 or less.

The infrared diffuse reflectivity spectrum of a surface of particles included in an active material obtained by one example of the above-described method is shown in FIG. 1 by assigning a symbol (1). Further, the infrared diffuse reflectivity spectrum for particles of an active material of a reference example is shown in FIG. 1 by assigning a symbol (2). The particles of the active material of the reference example are particles obtained without grinding raw materials and performing ball mill grinding in an aqueous solution.

As seen in FIG. 1, in the spectrum (1), the strongest peak $P_1$ within the range of 3350 to 3450 $cm^{-3}$ is 1.5, that is not more than 1.6. On the other hand, in the spectrum (2), the strongest peak $P_1$ in the range of 3350 to 3450 $cm^{-1}$ is 2.2, that is more than 1.6.

In the above-described method, the product obtained by the first heat treatment is subjected to ball mill grinding in an aqueous solution. However, the active material according to the first embodiment can be produced even if ball mill grinding in an aqueous solution is not performed.

For example, the active material according to the first embodiment can be obtained by mixing the product obtained by the first heat treatment with such a compound that can react with lithium and sodium to form a stable phase, and applying the second heat treatment to the mixture thus obtained.

For example, when aluminum oxide $Al_2O_3$ or zirconium oxide $ZrO_2$ can react with lithium by heat treatment to form $LiAlO_2$ or $Li_2ZrO_3$. Thus, when lithium hydroxide or lithium carbonate as impurities are present on a surface of the particles of the orthorhombic Na-containing niobium titanium composite oxide, oxide $Al_2O_3$ and zirconium oxide $ZrO_2$ react with them, whereby a hydroxyl group and a carbonate group on the surface of the particles of the orthorhombic Na-containing niobium titanium composite oxide can be reduced. Consequently, in the infrared diffuse reflectivity spectrum for the surface of the particles of composite oxide, the peak intensity IT of the strongest peak $P_1$ within the range of 3350 to 3450 $cm^{-1}$ and furthermore, the peak intensity $I_2$ of the strongest peak $P_2$ within the range of 1410 to 1460 $cm^{-1}$ can be controlled.

Should be noted the particles included in the active material obtained by the above procedure may be the orthorhombic Na-containing niobium titanium composite oxide that can be represented by the general formula of $Li_{2+v}Na_{2-w}M1_xTi_{6-y-z}Nb_yM2_zO_{14}$ in which the value of the subscript v is within a range of from 0 to 0.1, for example. When a mixture of raw materials is prepared such that the molar ratio of Li in a raw-material mixture increases, it is possible to synthesize an orthorhombic Na-containing niobium titanium composite oxide in such a state that the value of the subscript v in the above general formula is more than 0.1. When a nonaqueous electrolyte battery is produced using the obtained active material and is charged, a composite oxide included in the active material can be brought into a state in which the value of the subscript v in the above general formula is within a range of more than and 4 or less.

[Identification Method of Crystal Structure and Composition of Particles Included in Active Material]

The crystal structure and the composition of particles included in the active material to be measured can be identified by, for example, using a scanning electron microscope (SEM), an X-ray diffraction (XRD) measurement, an energy dispersive X-ray spectroscopy (EDX), and an inductively coupled plasma (ICP) emission spectroscopy in combination.

In the powder X-ray diffraction measurement of an active material, the crystal structure (crystal system) can be identified as follows. First, the value of a scattering angle 2θ is determined from the position of diffraction peak obtained by the XRD measurement. And then, a crystal spacing d is calculated according to the Bragg's law. The analysis allows the crystal structure (crystal system) to be identified. Should be noted that known substances can be identified by referring to diffraction data of standard substances such as cards of the Joint Committee on Powder Diffraction Standards (JCPDS).

The powder X-ray diffraction measurement of an active material is made as described below. First, the sample is ground in a mortar. A holder portion having a depth 0.2 mm or more formed on a glass sample-plate is filled with the obtained sample. The filled sample is smoothed by using a glass plate. At that time, care must be taken so as to prevent cracks, voids and the like due to insufficient filling with the sample. To correctly determine the peak position, the filling is performed in such a way that unevenness from the reference surface of the holder is not generated.

Next, the glass plate filled with the sample is placed in a powder X-ray diffraction device and a diffraction pattern is obtained by using Cu-Kα rays.

The influence of particle orientation may arise due to the particle shape of the sample, leading to a deviation of the peak position or changes of the intensity ratio. In such a case, the influence can be checked by filling a capillary made of Lindemann glass with the same sample and making measurements using a rotary sample stand.

The measurement can be performed by using Cu-Kα rays as a radiation source and setting a measurement range to a range of 10°≤2θ≤90° to obtain the X-ray diffraction pattern.

As an apparatus for powder X-ray diffraction measurement, SmartLab manufactured by Rigaku is used.

Measurement is performed under the following condition: Cu target; 45 kV, 200 mA; soller slit: 5 degrees in both incident light and received light; step width: 0.02 deg; scan speed: 20 deg/min; semiconductor detector: D/teX Ultra 250; sample plate holder: flat glass sample plate holder (0.5 mm in thickness); measurement range: 5°≤2θ≤90°. When another apparatus is used, measurement using a standard Si powder for powder X-ray diffraction is performed under conditions where a peak intensity and a peak top position correspond to those by obtained using the above apparatus so as to obtain measurement results equivalent to those described above.

When the orthorhombic Na-containing niobium titanium composite oxide is included in the active material to be measured, an X-ray diffraction pattern assigned to the orthorhombic system such as the space group of Cmca or Fmmm can be obtained by the X-ray diffraction measurement.

Next, particles are observed according to the following procedure by using a scanning electron microscope (SEM) and energy dispersive X-ray spectroscopy (EDX) in combination.

First, a powder of an active material to be measured is observed through the scanning electron microscope (SEM). A sample is sampled in an inert atmosphere such as argon and nitrogen while avoiding contact with the air.

Some particles are selected randomly using an SEM observation image at a magnification of 3000. At that time, the particles are selected so that the particle size distribution of the selected particles is as broad as possible.

Subsequently, each of the selected particles is subjected to elemental analysis by energy dispersive X-ray spectroscopy (EDX). Thus, it is possible to identify the kind and amount of elements other than Li among the elements included in each of the selected particles. As for Li, it is possible to obtain information on the content of Li in the whole active material by inductively coupled plasma (ICP) atomic emission spectrometry, to be described later.

If the observed particle contains Na, Ti, Nb, and O and further, an X-ray diffraction pattern assigned to the orthorhombic system is obtained from the active material to be measured by the above XRD measurement, it is found that particles of an orthorhombic Na-containing niobium titanium composite oxide are present in the active material to be measured.

The amount of element included in an active material can be identified by inductively coupled plasma (ICP) emission spectroscopy following the procedure below.

First, an active material to be measured is dissolved by acid to prepare a liquid sample. At that time, hydrochloric acid, nitric acid, sulfuric acid, hydrogen fluoride or the like can be used as acid. By subjecting the liquid sample to ICP emission spectrochemical analysis, the concentrations of elements included in the active material to be measured can be known.

[Active Material Included in Battery]

The composition, crystal structure, and particle size of particles included in an active material incorporated into a battery can be confirmed by the following procedures.

First, to grasp a crystalline state of the active material, a state in which lithium ions were extracted from the active material to be measured is created. Incidentally, the orthorhombic Na-containing niobium titanium composite oxide includes lithium that is not involved in a charge and discharge in the structure thereof. Thus, "the state in which lithium ions are extracted" means a state in which lithium involved in a charge and discharge is extracted. For example, when the active material to be measured is included in the negative electrode, the battery is put into a completely discharged state. However, even in a state in which the battery is discharged, lithium ions remaining in the active material may be present. Therefore, care must be taken when analyzing an X-ray diffraction pattern.

Next, the battery put into such a state is disassembled in a glove box filled with argon. An electrode including the active material to be measured is taken out of the disassembled battery. The electrode is washed with an appropriate solvent. For example, ethylmethyl carbonate may be used. If washing is insufficient, an impurity phase such as lithium carbonate and lithium fluoride may be mixed under the influence of lithium ions remaining in the electrode. In such a case, a tight container allowing a measuring atmosphere in an inert gas may be used.

The cross section of the electrode taken out as described above is cut out by an ion milling device. The cross section of the cut-out electrode is observed through the scanning electron microscope (SEM) described previously. Sampling is performed in an inert atmosphere such as argon or nitrogen without being exposed to the air.

As described above, some particles are selected using an SEM observation image at a magnification of 3000. At that time, the particles are selected so that the particle size distribution of the selected particles is as broad as possible.

Subsequently, each of the selected particles is subjected to elemental analysis by energy dispersive X-ray spectroscopy (EDX). Thus, it is possible to identify the kind and amount of elements other than Li among the elements included in each of the selected particles.

The crystal structure of the compound included in each particle selected through the SEM can be identified by the X-ray diffraction (XRD) measurement described above.

The XRD measurement of the electrode can be performed by cutting the electrode to be measured into a size having the same area of the holder of the wide-angle X-ray diffractometer and directly attaching the cut electrode to the glass holder, and measuring it. At this time, XRD is measured in advance with regard to the kind of the metal foil of the electrode current collector to determine a position where a peak originating from the current collector appears. Furthermore, it is necessary to determine in advance whether or not there are peaks originated from the ingredients such as a conductive agent and binder. When the peak of the current collector is overlapped on the peak of the active material, it is desired to separate the active material from the current collector prior to the measurement. This is to separate the overlapped peaks and to measure the peak intensity quantitatively. Of course, the procedure may be omitted if these data have been determined in advance. Although the electrode may be separated physically, it is easily separated by applying ultrasonic waves in a solvent. Then, the electrode recovered in this manner can be subjected to wide-angle X-ray diffraction for the active material.

The composition of the whole active material included in the electrode can be measured by the following procedure.

First, the electrode including an active material to be measured is taken out of the nonaqueous electrolyte battery and washed, according to the procedures described above.

Using a portion of the washed electrode, the composition of particles included in the electrode is identified by the method described above.

On the other hand, another portion of the washed electrode is put into an appropriate solvent to apply an ultrasonic wave thereto. For example, by putting an electrode body into ethylmethyl carbonate in a glass beaker and vibrating the electrode body in an ultrasonic washer, an electrode layer including the electrode active material can be peeled off a current collector substrate. Next, the peeled electrode layer is dried under reduced pressure. By grinding the obtained electrode layer in a mortar or the like, a powder including the active material to be measured, a conductive auxiliary, a binder and the like is obtained. By dissolving the powder by acid, a liquid sample including the active material can be prepared. At that time, hydrochloric acid, nitric acid, sulfuric acid, hydrogen fluoride or the like can be used as acid. By subjecting the liquid sample to ICP emission spectral analysis, the concentrations of elements included in the active material included in the electrode can be found.

By using combination of the identification of the composition by SEM and EDX, the identification of the crystal structure by XRD, and results of ICP emission spectrochemical analysis for each particle included in the electrode, the composition and the crystal structure of compound contained in each particle can be identified.

[Method of Performing Diffuse FT-IR Measurement for Surface of Particles of Composite Oxide Included in Battery]

The diffuse FT-IR for a surface of the particles of the composite oxide included in a battery can be measured by the following procedure.

First, as described above, the battery is brought into a discharged state. Next, the battery in the discharged state is disassembled in a glove box filled with argon gas. Next, an electrode including a composite oxide to be measured is removed from the disassembled battery.

The electrode is washed with an ethyl methyl carbonate solvent and then dried. For example, when the electrode includes a conductive agent such as carbon and a polymer such as a polymer material, a layer including a composite oxide to be measured is peeled from a current collector, and a polymer material is removed by a Soxhlet extraction method. Thus, the composite oxide to be measured and a carbon material can be extracted. When NMP is used as a solvent in the Soxhlet extraction method, a polymer material can be removed from an electrode. A mixture of the composite oxide and the carbon material obtained by the Soxhlet extraction method is subjected to oxidation treatment using oxygen, ozone, or the like, the carbon material is oxidized to form carbon dioxide, and carbon dioxide is removed from the mixture. Thus, the composite oxide to be measured can solely be extracted.

Alternatively, a layer including the composite oxide to be measured is peeled from a current collector, and carbon and a polymer can be simultaneously removed by heat treatment. The composite oxide to be measured which has been obtained by those methods is subjected to the diffuse reflectance FT-IR measurement according to the above-described procedure.

[Method of Measuring Specific Surface Area]

In measuring a specific surface area, it is possible to use a method in which a molecule of which the adsorption occupying area is known is made to adsorb to a surface of a powder particle at the temperature of liquid nitrogen, and the specific surface area of the powder particle is calculated from the amount of the molecule adsorbed on it. A method that is most frequently used to obtain the specific surface area is the BET method using the low-temperature and low-humidity physical adsorption of an inert gas. This method is based on the best-known theory of the method of calculating the specific surface area in which the Langmuir theory as a monolayer adsorption theory is extended to multilayer adsorption. The specific surface area determined by the above method is referred to as "BET specific surface area".

According to the first embodiment, an active material including particles of Na-containing niobium titanium composite oxide having an orthorhombic crystal structure is provided. In the infrared diffuse reflectivity spectrum obtained by a diffuse reflectance infrared Fourier transform spectrometry measurement for a surface of the particles of the Na-containing niobium titanium composite oxide, the peak intensity $I_1$ of the strongest peak $P_1$ within the range of 3350 to 3450 $cm^{-1}$ is 1.6 or less. By including such composite oxide, the active material according to the first embodiment can achieve a nonaqueous electrolyte battery which can exhibit a high reversible capacity.

Second Embodiment

According to a second embodiment, there is provided a nonaqueous electrolyte battery. The nonaqueous electrolyte battery includes a negative electrode, a positive electrode, and a nonaqueous electrolyte. The negative electrode includes the active material according to the first embodiment.

The nonaqueous electrolyte battery according to the second embodiment can further include a separator provided between the positive electrode and the negative electrode. The positive electrode, the negative electrode, and the separator can constitute an electrode group. The nonaqueous electrolyte may be held in the electrode group.

The nonaqueous electrolyte battery according to the second embodiment can further include a container member accommodating the electrode group and the nonaqueous electrolyte.

The nonaqueous electrolyte battery according to the second embodiment can further include a positive electrode terminal electrically connected to the positive electrode and a negative electrode terminal electrically connected to the negative electrode. At least a part of the positive electrode terminal and at least a part of the negative electrode terminal may be extended to the outside of the container member.

Hereinafter, the negative electrode, the positive electrode, the nonaqueous electrolyte, the separator, the container member, the positive electrode terminal, and the negative electrode terminal will be described in detail.

1) Negative Electrode

The negative electrode may include a current collector and a negative electrode layer (a negative electrode active material-containing layer). The negative electrode layer may be formed on one surface or both surfaces of the current collector. The negative electrode layer may include a negative electrode active material and also optionally a conductive agent and a binder.

The active material according to the first embodiment may be included in the negative electrode layer as the negative electrode active material.

The negative electrode active material may include a negative electrode active material other than the active material according to the first embodiment. Such a negative electrode active material includes a lithium titanate having a spinel structure, a monoclinic niobium titanium composite oxide, and an orthorhombic Na-containing lithium titanium composite oxide. The active material according to the first embodiment is preferably included in 70% by mass, and more preferably 80% by mass, based on the total mass of the negative electrode active material.

The conductive agent can have the effect of improving current-collecting performance and reducing contact resistance between the negative electrode active material and the current collector. Examples of the conductive agent include carbonaceous substances such as acetylene black, carbon black, graphite, carbon nanofiber, and carbon nanotube. These carboneous substances may be used singly or plural carbonaceous substances may be used.

The binder can have the effect of binding the negative electrode active material, the conductive agent, and the negative electrode current collector. Examples of the binder include polytetrafluoro ethylene (PTFE), polyvinylidene difluoride (PVdF), fluororubber, styrene-butadiene rubber, acrylic resin and copolymers thereof, polyacrylic acid, and polyacrylonitrile.

As for the blending ratio of the negative electrode active material, the conductive agent, and the binder is preferably within the ranges of: 70% by mass or more and 96% by mass or less for the negative electrode active material; 2% by mass or more and 28% by mass or less for the conductive agent; and 2% by mass or more and 28% by mass or less for the binder. The amount of the conductive agent is set to 2% by mass or more, whereby the current-colleting performance of the negative electrode layer can be improved and then excellent large-current characteristics can be expected. Also, the amount of the binder is set to 2% by mass or more, whereby sufficient binding properties between the negative electrode layer and the current collector can be obtain and then excellent cycle characteristics can be expected. From the viewpoint of higher capacities, on the other hand, the conductive agent and the binder are each preferably set to 28% by mass or less.

The negative electrode current collector is preferably formed from aluminum foil or aluminum alloy foil including elements such as Mg, Ti, Zn, Mn, Fe, Cu, and Si.

The negative electrode is produced by, for example, the following method. First, a negative electrode active material, a conductive agent, and a binder are suspended in a solvent to prepare a slurry. The slurry thus prepared is applied to one surface or both surfaces of the negative electrode current collector and next, the coated film is dried. In this manner, a negative electrode layer can be formed. Then, the negative electrode layer is pressed.

Alternatively, a negative electrode active material, a conductive agent and a binder can be formed into pellets, and the pellets can be arranged on the negative electrode current collector to produce the negative electrode layer.

2) Positive Electrode

The positive electrode can include a current collector and a positive electrode layer (a positive electrode active material-containing layer). The positive electrode layer may be formed on one surface or both surfaces of the current collector. The positive electrode layer can include a positive electrode active material, and optionally a conductive agent and a binder.

The positive electrode active material may be, for example, an oxide or a composite oxide. Lithium can be inserted into the oxide and the composite oxide, and be extracted from them. Examples of the oxide and composite oxide include a manganese dioxide ($MnO_2$), an iron oxide, a copper oxide, a nickel oxide, a lithium manganese composite oxide (e.g., $Li_xMn_2O_4$ or $Li_xMnO_2$), a lithium nickel composite oxide (e.g., $Li_xNiO_2$), a lithium cobalt composite oxide (e.g., $Li_xCoO_2$), a lithium nickel cobalt composite oxide (e.g., $LiNi_{1-y}Co_yO_2$), a lithium manganese cobalt composite oxide (e.g., $Li_xMn_yCo_{1-y}O_2$), a lithium nickel cobalt manganese composite oxide (e.g., $LiNi_{1-y-z}Co_yMn_zO_2$), a lithium nickel cobalt aluminum composite oxide (e.g., $LiNi_{1-y-z}Co_yAl_zO_2$), a lithium manganese nickel composite oxide having a spinel structure (e.g., $Li_xMn_{2-y}Ni_yO_4$), a lithium phosphorus oxide having an olivine structure (e.g., $Li_xFePO_4$, $Li_xMnPO_4$, $Li_xMn_{1-y}Fe_yPO_4$, and $Li_xCoPO_4$), an iron sulfate (e.g., $Fe_2(SO_4)_3$), and a vanadium oxide (e.g., $V_2O_5$). In the above-described formula, the ranges of $0<x\leq1$, $0<y\leq1$, and $0\leq z\leq1$ are preferably. As the active material, one of these compounds may be used singly, or combination of two or more of the compounds can be used.

Among these, a lithium manganese composite oxide (e.g., $Li_xMn_2O_4$), a lithium cobalt composite oxide (e.g., $Li_xCoO_2$), a lithium nickel cobalt composite oxide (e.g., $LiNi_{1-y}Co_yO_2$), a lithium manganese cobalt composite oxide (e.g., $Li_xMn_yCo_yO_2$), a lithium nickel cobalt manganese composite oxide (e.g., $LiNi_{1-y-z}Co_yMn_zO_2$), and a lithium phosphorus oxide having an olivine structure (e.g., $Li_xFePO_4$, $Li_xMnPO_4$, $Li_xMn_{1-y}Fe_yPO_4$, and $Li_xC_oPO_4$) are preferable. In the above-described formula, the ranges of $0<x\leq1$, $0\leq y\leq1$, and $0\leq z\leq1$ are preferably.

The conductive agent can have the effect of improving the current collection performance and reducing the contact resistance of the active material with the current collector. Examples of the conductive agent include carbonaceous substances such as acetylene black, carbon black, graphite, carbon nanofiber, and carbon nanotube. These carbonaceous substances may be used singly or plural carbonaceous substances may be used.

The binder can have the effect of binding the active material, the conductive agent, and the current collector. Examples of the binder include polytetrafluoroethylene (PTFE), polyvinylidene fluoride (PVdF), fluorine-based rubber, styrene butadiene rubber, acrylic resin, copolymers of acrylic resin, polyacrylic acid, and polyacrylonitrile.

As for the blending ratio of the positive electrode active material, the conductive agent and the binder in the positive electrode layer, it is preferable that the content of the positive electrode active material is from 80% by mass to 95% by mass, the content of the conductive agent is from 3% by mass to 18% by mass, and the content of the binder is from 2% by mass to 17% by mass. The amount of the conductive agent is set to 3% by mass or more, whereby the above-described effect can be obtained. The amount of the conductive agent is set to 18% by mass or less, whereby decomposition of a nonaqueous electrolyte at a surface of the conductive agent can be restrained during the storage at a high temperature. The amount of the binder is set to 2% by mass or more, whereby the sufficient strength of the electrode can be obtained. If the amount of the binder is set to 17% by mass, a content of the binder, which is an insulating material, in the positive electrode is decreased, and therefore, an internal resistance can be decreased.

The current collector is preferably an aluminum foil, or an aluminum alloy foil containing one or more elements selected from Mg, Ti, Zn, Mn, Fe, Cu, and Si.

The positive electrode is produced by, for example, the following procedures. At first, a positive electrode active material, a conductive agent, and a binder are suspended in a solvent to prepare a slurry. The slurry is applied to one surface or both surfaces of a positive electrode current collector, the coated film is dried.

Thus, a positive electrode layer can be obtained. And then, the layer is subjected to a pressing. Alternatively, a positive electrode active material, a conductive agent, and a binder are formed into pellets, and then, the pellets can be arranged on the positive electrode current collector to produce a positive electrode layer.

3) Nonaqueous Electrolyte

The nonaqueous electrolyte may be, for example, a liquid nonaqueous electrolyte or gel-like nonaqueous electrolyte. The liquid nonaqueous electrolyte is prepared by dissolving an electrolyte in an organic solvent. The concentration of the electrolyte is preferably within a range of 0.5 mol/L to 2.5 mol/L. The gel-like nonaqueous electrolyte can be prepared by mixing a liquid nonaqueous electrolyte and a polymer material to obtain a composite.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide ($LiN(CF_3SO_2)_2$). One electrolyte of these electrolytes can be used alone, or two or more electrolytes of these electrolytes can be used in mixture. The electrolyte preferably includes $LiPF_6$.

Examples of the organic solvent include a cyclic carbonate such as propylene carbonate (PC), ethylene carbonate (EC), or vinylene carbonate; a chain carbonate such as diethyl carbonate (DEC), dimethyl carbonate (DMC), or methyl ethyl carbonate (MEC); a cyclic ether such as tetrahydrofuran (THF), 2-methyl tetrahydrofuran (2MeTHF), or dioxolane (DOX); a chain ether such as dimethoxy ethane (DME) or diethoxy ethane (DEE);

acetonitrile (AN), and sulfolane (SL). One of these organic solvents can be used alone or two or more solvent can be used as a mixed solvent.

More preferred examples of organic solvent include a mixed solvent which is prepared by mixing two or more solvent selected from the group consisting of propylene carbonate (PC), ethylene carbonate (EC), diethyl carbonate (DEC), dimethyl carbonate (DMC), and methyl ethyl carbonate (MEC). By using such a mixed solvent, a nonaqueous electrolyte battery which is excellent in charge-and-discharge-cycle characteristics can be obtained. Furthermore, an additive can be added to the nonaqueous electrolyte.

4) Separator

As the separator, for example, a porous film formed from materials such as polyethylene, polypropylene, polyethylene terephthalate, cellulose, and polyvinylidene fluoride (PVdF), nonwoven fabric made of synthetic resin or the like can be used. Further, a separator obtained by applying an inorganic compound to a porous film can also be used.

(5) Container Member

As the container member, for example, a bag-like container made of laminate film or a metallic container is used.

As the shape thereof, the flat shape, square shape, cylindrical shape, coin shape, button shape, sheet shape, and stack shape can be cited. It is needless to say that in addition to a small battery mounted on mobile electronic devices, the nonaqueous electrolyte battery may also be a large battery mounted on two-wheeled to four-wheeled automobiles.

As the laminate film, for example, a multilayer film in which a metal layer is sandwiched between resin films can be used. The laminate film used as a container member is not limited to one in which a metal layer is sandwiched between resin films, a multilayer film consisting of a metal layer and resin layers covered the metal layer can be also used.

The metal layer is preferably aluminum foil or aluminum alloy foil to reduce the weight thereof. As the resin film, for example, a polymeric material such as polypropylene (PP), polyethylene (PE), nylon, and polyethylene terephthalate (PET) can be used. The laminate film can be formed into the shape of a container member by performing heat sealing. The laminated film preferably has a thickness of 0.2 mm or less.

The container made of metal can be formed from, for example, aluminum or an aluminum alloy. The aluminum alloy preferably contains an element such as magnesium, zinc, or silicon. On the other hand, the content of transition metal such as iron, copper, nickel, and chromium is preferably reduced to 100 ppm or less. Whereby, long-term reliability and heat dissipation properties in a high-temperature environment can remarkably be improved.

The wall thickness of the container made of metal is preferably 0.5 mm or less and particularly preferably 0.2 mm or less.

(6) Negative Electrode Terminal

The negative electrode terminal is preferably formed from a material that is electrically stable at a potential in the range of 0.8 V to 3.0 V with respect to the oxidation-reduction potential of lithium, and has conductivity. More specifically, the negative electrode terminal is preferably formed from aluminum or an aluminum alloy including an element such as Mg, Ti, Zn, Mn, Fe, Cu, and Si. To reduce contact resistance with the negative electrode current collector, the negative electrode terminal is preferably formed from a material similar to that of the negative electrode current collector.

(7) Positive Electrode

The positive electrode terminal is preferably formed from a material that is electrically stable at a potential within the range of 3.0 V to 4.5 V with respect to the oxidation-reduction potential of lithium, and has conductivity. More specifically, the positive electrode terminal is preferably formed from aluminum or an aluminum alloy containing an element such as Mg, Ti, Zn, Mn, Fe, Cu, and Si. To reduce contact resistance with the positive electrode current collector, the positive electrode terminal is preferably formed from a material similar to that of the positive electrode current collector.

Next, the nonaqueous electrolyte battery according to the second embodiment will be more specifically described with reference to the drawings.

First, a nonaqueous electrolyte battery as an example according to the second embodiment will be described with reference to FIGS. 2 and 3.

Figure 2:
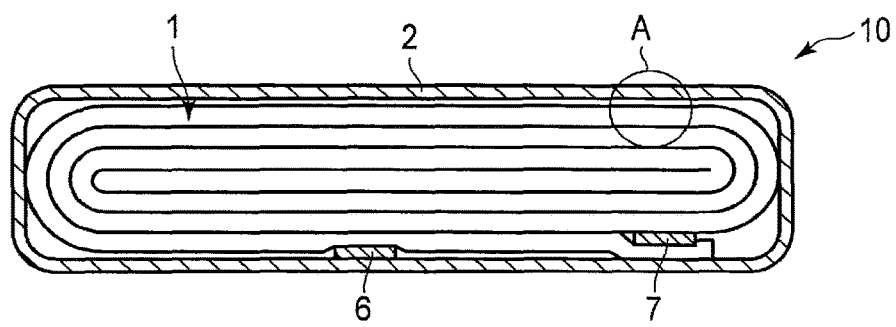
FIG. 2 is a schematic cross-sectional view of an example of a nonaqueous electrolyte battery according to a second embodiment.

FIG. 2 is a schematic cross-sectional view of an example of a nonaqueous electrolyte battery according to a second embodiment. FIG. 3 is an enlarged cross-sectional view of an A portion in FIG. 2

A nonaqueous electrolyte battery 10 shown in FIGS. 2 and 3 includes a bag-shaped container member 2 shown in FIG. 2, an electrode group 1 shown in FIGS. 2 and 3, and a nonaqueous electrolyte (not shown). The electrode group 1 and the nonaqueous electrolyte are accommodated in the container member 2. The nonaqueous electrolyte is held in the electrode group 1.

The bag-shaped container member 2 is made of a laminate film including two resin layers and a metal layer sandwiched between the resin layers.

As shown in FIG. 2, the electrode group 1 is a wound (coiled) electrode group in a flat form. The coiled electrode group 1 in a flat form is formed by, as shown in FIG. 3, spirally winding a laminate which includes, from the outside to the inside, a negative electrode 3, a separator 4, a positive electrode 5, and a separator 4, and then press-forming the wound laminate.

The negative electrode 3 includes a negative electrode current collector 3a and a negative electrode layer 3b. The negative electrode layer includes the active material according to the first embodiment. A part of the negative electrode 3 located in the outermost layer has a configuration in which a negative electrode layer 3b is formed on one surface which is the internal surface of a negative electrode current collector 3a as shown in FIG. 3. In the other portion of the negative electrode 3, the negative electrode layers 3b are formed on both surfaces of the negative electrode current collector 3a.

The positive electrode 5 includes a positive electrode current collector 5a and positive electrode layers 5b formed on both surfaces of the positive electrode current collector 5a.

As shown in FIG. 2, in the vicinity of the outer peripheral edge of the wound electrode group 1, a negative electrode terminal 6 is connected to the negative electrode current collector 3a in the outermost negative electrode 3, and a positive electrode terminal 7 is connected to the positive electrode current collector 5a in the inside positive electrode 5. The negative electrode terminal 6 and the positive electrode terminal 7 are extended out from the opening of the bag-shaped container member 2.

The nonaqueous electrolyte battery 10 shown in FIGS. 2 and 3 can be produced according to the following procedure, for example. First, an electrode group 1 is produced. The electrode group 1 is then enclosed in a bag-shaped container member 2. At that time, one ends of a negative electrode terminal 6 and positive electrode terminal 7 are protruded toward the outside of the container member 2. Next, the circumference of the container member 2 is heat-sealed while a part thereof remains unsealed. Next, for example, a liquid nonaqueous electrolyte is injected via the opening of the bag-shaped container member 2 which is not heat-sealed. Finally, the opening is heat-sealed, and thereby the wound electrode group 1 and the liquid nonaqueous electrolyte are completely sealed.

Figure 5:
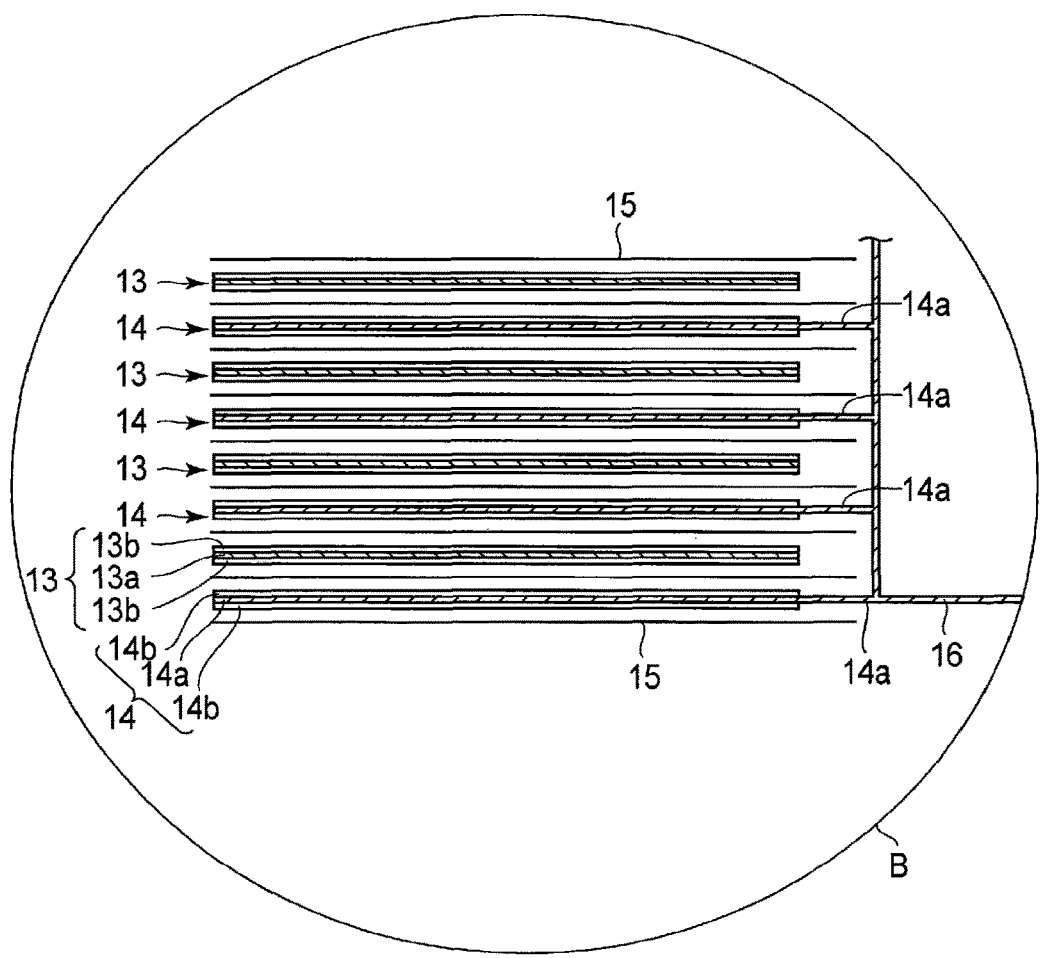
FIG. 5 is an enlarged cross-sectional view of a B portion in FIG. 4.

The nonaqueous electrolyte battery according to the second embodiment is not limited to the nonaqueous electrolyte battery as an example shown in FIGS. 2 and 3, and may be, for example, a battery having a structure shown in FIGS. 4 and 5.

FIG. 4 is a partially cutaway perspective view schematically showing another example of a nonaqueous electrolyte battery according to the second embodiment. FIG. 5 is an enlarged cross-sectional view of a B portion in FIG. 4.

A nonaqueous electrolyte battery 10 shown in FIGS. 4 and 5 includes an electrode group 11 shown in FIGS. 4 and 5, a container member 12 shown in FIG. 4, and a nonaqueous electrolyte (not shown). The electrode group 11 and the nonaqueous electrolyte are accommodated in the container member 12. The nonaqueous electrolyte is held in the electrode group 11.

The container member 12 is made of a laminate film including two resin layers and a metal layer sandwiched between the resin layers.

As shown in FIG. 5, the electrode group 11 is a stacked electrode group. As shown in FIG. 5, the stacked electrode group 11 has a structure in which positive electrodes 13 and negative electrodes 14 are alternately laminated with a separator 15 sandwiched therebetween.

The electrode group 11 includes positive electrodes 13. Each of the positive electrodes 13 includes a positive electrode current collector 13a, and a positive electrode layer 13b supported on each of the both surfaces of the positive electrode current collector 13a. The electrode group 11 includes negative electrodes 14. Each of the negative electrodes 14 includes a negative electrode current collector 14a, and a negative electrode layer 14b supported on each of the both surfaces of the negative electrode current collector 14a. A part of the negative electrode current collector 14a of each of the negative electrodes 14 protrudes at one side from the negative electrode 14. The protruded part of the negative electrode current collector 14a is electrically connected to a strip-shaped negative electrode terminal 16. The tip of the strip-shaped negative electrode terminal 16 is extended out from the container member 12. Although not shown in the drawings, a part of the positive electrode current collector 13a of the positive electrode 13 protrudes from the positive electrode 13 at the side opposed to the protruded side of the negative electrode current collector 14a. The protruded part of the positive electrode current collector 13a from the positive electrode 13 is electrically connected to a strip-shaped positive electrode terminal 17. The tip of the strip-shaped positive electrode terminal 17 is opposed to the negative electrode terminal 16, and extended out from a side of the container member 12.

The nonaqueous electrolyte battery according to the second embodiment includes the active material according to the first embodiment. Therefore, the nonaqueous electrolyte battery according to the second embodiment can exhibit excellent high reversible capacity.

Third Embodiment

According to a third embodiment, there is provided a battery pack. The battery pack includes the nonaqueous electrolyte battery according to the second embodiment.

The battery pack according to the third embodiment can include one or more nonaqueous electrolyte batteries (unit cells) according to the second embodiment described above. The nonaqueous electrolyte batteries can be electrically connected in series, in parallel, or with a combination of series connection and parallel connection. The nonaqueous electrolyte batteries can be electrically connected to constitute a battery module. The battery pack according to the third embodiment may include battery modules.

The battery pack according to the third embodiment may further include a protective circuit. The protective circuit has a function to control charging and discharging of the nonaqueous electrolyte battery. Alternatively, a circuit included in an equipment (for example, electronic devices, vehicles, and the like) where the battery pack serves as a power source may be used as the protective circuit for the battery pack.

Moreover, the battery pack according to the third embodiment may further include an external power distribution terminal. The external power distribution terminal is configured to externally output the current from the nonaqueous electrolyte battery, and to input the current to the nonaqueous electrolyte battery. In other words, when the battery pack is used as a power source, the current is externally provided via the external power distribution terminal. Also, when the battery pack is charged, the charging current (including regenerative energy caused by power of vehicles such as automobiles) is provided to the battery pack via the external power distribution terminal.

Next, a battery pack as an example according to the third embodiment will be described with reference to the drawings.

Figure 6:
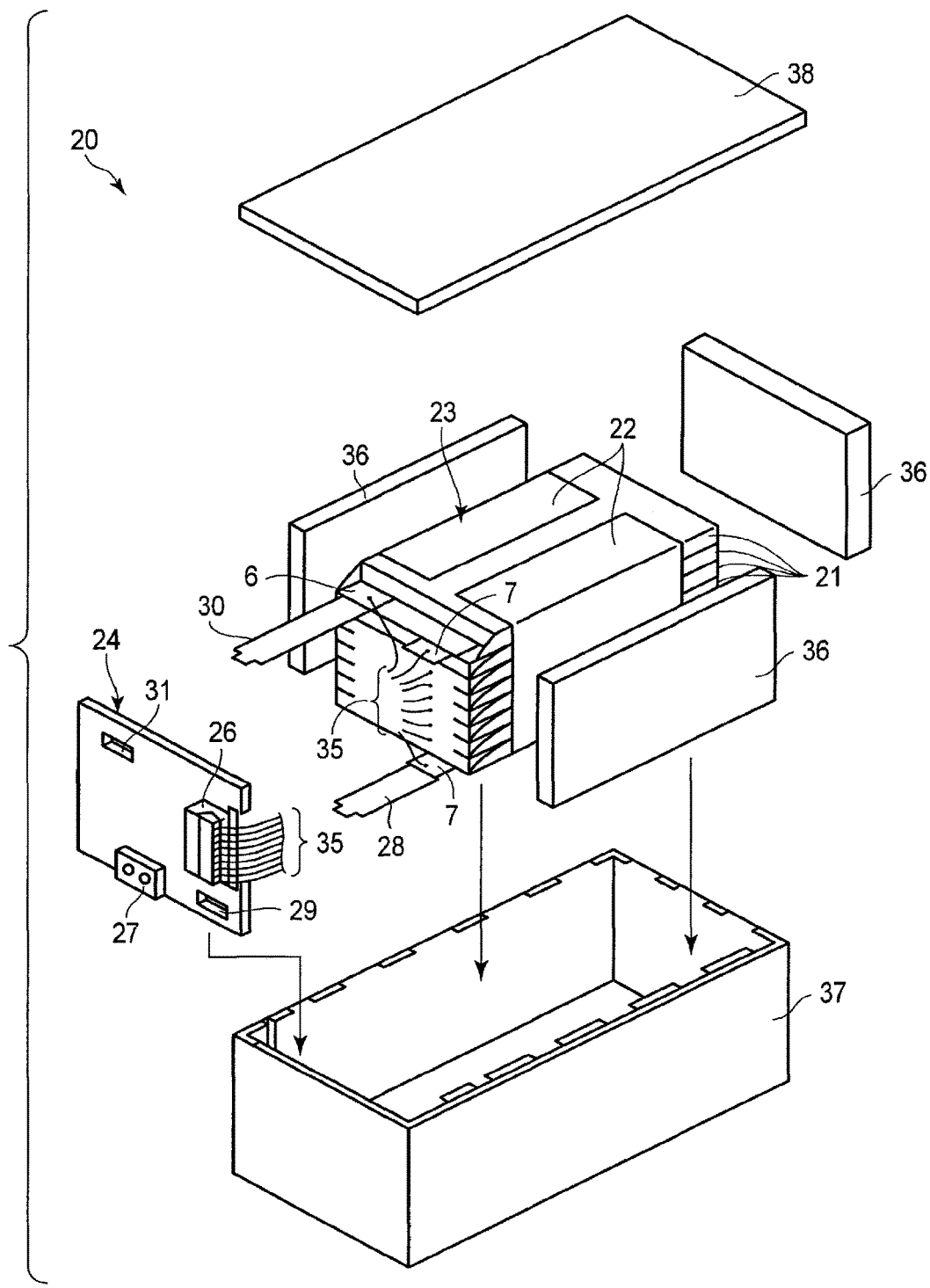
FIG. 6 is a schematic exploded perspective view of an example of a battery pack according to a third embodiment.

FIG. 6 is an exploded perspective view showing one example of a battery pack according to a third embodiment.

Figure 7:
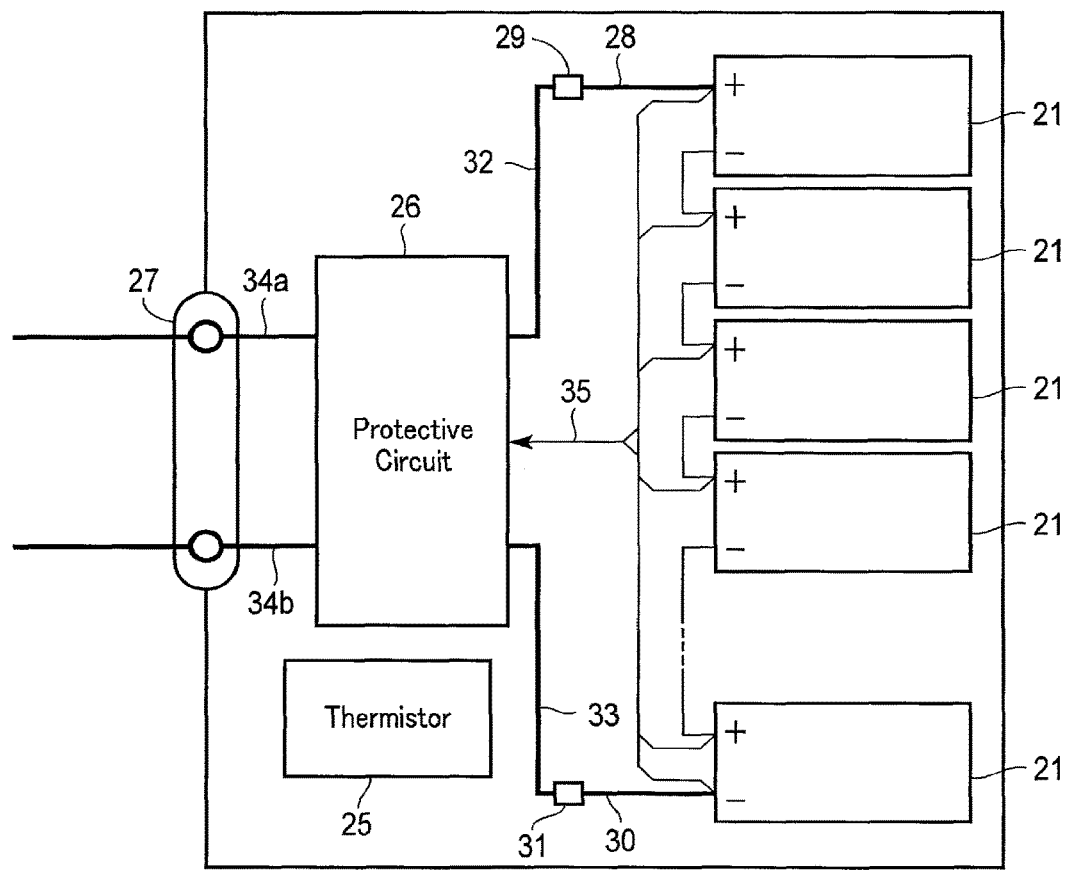
FIG. 7 is a block diagram showing an electric circuit of the battery pack in FIG. 6.

FIG. 7 is a block diagram showing an electric circuit of the battery pack in FIG. 6.

A battery pack 20 shown in FIGS. 6 and 7 includes a plurality of unit cells 21. Each of the plurality of unit cells 21 is flat nonaqueous electrolyte battery 10 described with reference to FIGS. 2 and 3.

The plurality of unit cells 21 are stacked so that the negative electrode terminal 6 and the positive electrode terminal 7 extended outside are arranged in the same direction, and fastened with an adhesive tape 22 to constitute a battery module 23. The unit cells 21 are electrically connected to each other in series as shown in FIG. 7.

A printed wiring board 24 is arranged opposed to the side plane where the negative electrode terminal 6 and the positive electrode terminal 7 of the unit cell 21 are extended. A thermistor 25, a protective circuit 26, and a power distribution terminal 27 to an external device are mounted on the printed wiring board 24 as shown in FIG. 7. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. An negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wiring 32 and 33 formed in the printed wiring board 24.

The thermistor 25 detects the temperature of the unit cells 21 and the detection signal is sent to the protective circuit 26. The protective circuit 26 can shut down a plus-side wiring 34a and a minus-side wiring 34b between the protective circuit 26 and the power distribution terminal 27 to an external device under a predetermined condition. The predetermined condition indicates, for example, the case where the temperature detected by the thermistor 25 becomes a predetermined temperature or more. Another example of the predetermined condition indicates the case where the over-charge, over-discharge, or over-current of the unit cells 21 is detected. The detection of the over-charge and the like is performed on each of the unit cells 21 or the whole of the battery module 23. When each of the unit cells 21 is detected, the cell voltage may be detected, or positive electrode or negative electrode potential may be detected. In the case of the latter, a lithium electrode to be used as a reference electrode is inserted into each of the unit cells 21. In the case of the battery pack 20 of FIGS. 6 and 7, wiring 35 for voltage detection is connected to each of the unit cells 21. Detection signals are sent to the protective circuit 26 through the wiring 35.

Protective sheets 36 including rubber or resin are arranged on three side planes of the battery module 23 except the side plane from which the positive electrode terminal 7 and the negative electrode terminal 6 are protruded.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the other internal surface in a short side direction. The battery module 23 is located in a space surrounded by the protective sheets 36 and the printed wiring board 24. A lid 38 is attached to the upper surface of the housing case 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

In FIGS. 6 and 7, the structure in which the unit cells 21 are connected to each other in series is shown. In order to increase the battery capacity, the unit cells may be connected to each other in parallel. Furthermore, the assembled battery packs can be connected to each other in series and/or in parallel.

The aspect of the battery pack according to the third embodiment may be appropriately changed depending on its application. The applications of the battery pack according to the third embodiment are preferably those for which cycle characteristics when large-current is taken out are desired. Specific examples of these applications include application as a battery of a digital camera and application to a vehicle such as a two- or four-wheeled hybrid electric vehicle, a two- or four-wheeled electric vehicle or a power-assisted bicycle. Particularly preferably, the battery pack according to the third embodiment is used for a battery mounted to a vehicle.

In a vehicle having the battery pack according to the third embodiment mounted, the battery pack is configured to, for example, recover regenerative energy caused by power of the vehicle. Examples of the vehicle include two to four-wheeled hybrid electric automobiles, two to four-wheeled electric automobiles, electric assist bicycles, and trains (electric trains).

Figure 8:
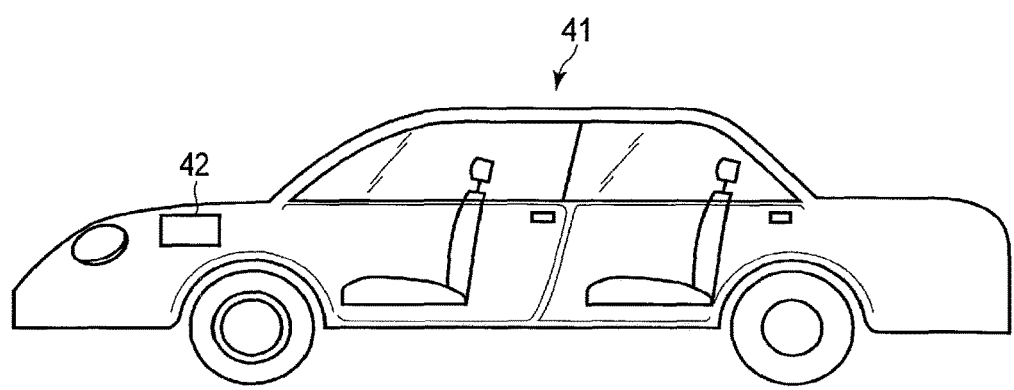
FIG. 8 is a schematic sectional view showing an example of an automobile which includes an example of a battery pack according to a third embodiment.

FIG. 8 shows an example of an automobile which includes a battery pack according to the third embodiment.

The automobile 41 shown in FIG. 8 includes a battery pack 42 which is an example of the battery pack according to the third embodiment mounted in its engine room. The mounting position is not limited to engine rooms. For example, the battery pack may also be mounted in rear parts of automobiles or under seats.

The battery pack according to the third embodiment includes the nonaqueous electrolyte battery according to the second embodiment. Therefore, the battery pack according to the third embodiment can exhibit excellent high reversible capacity.

EXAMPLES

Examples will be explained below, but the present invention is not limited to the Examples described below without departing from the scope of the invention.

Example 1

In Example 1, an active material of Example 1 was obtained by the following procedure.

First, as raw materials, a powder of titanium oxide $TiO_2$, a powder of lithium carbonate $Li_2CO_3$, a powder of sodium carbonate $Na_2CO_3$, and a powder of niobium (V) hydroxide $Nb(OH)_5$ were provided. Those raw materials were mixed such that the molar ratio of Li:Na:Ti:Nb in a mixture was 2:1.7:5.7:0.3. Prior to mixing, the raw materials were satisfactorily ground such that an average particle size of the powder of each raw material was 5 μm or less.

Next, a mixture of the raw materials was subjected to a first heat treatment at 900° C. for 3 hours in the air atmosphere. The first heat treatment was performed in such a state that the mixture of the raw materials was introduced into an alumina crucible, and an alumina lid was used to prevent evaporation. Thus, a powder of a product was obtained.

Next, the obtained product was subjected to ball mill grinding in purified water. In such case, media having a median diameter of 1 mm were put into a pot in an amount of 30% based on the pot capacity. The input amount of the product was 30% based on the pot capacity. The ball mill grinding was performed at room temperature and 500 rpm for 1 hour.

Next, the product was taken from the ball mill pot and subjected to a second heat treatment at 700° C. for 1 hour in the air atmosphere. Thus, the active material of Example 1 was obtained.

A portion of the active material of Example 1 was subjected to ICP analysis, XRD measurement, and SEM observation, each of which is described above. As a result, it was found that the active material of Example 1 included particles of an orthorhombic composite oxide having a composition of $Li_2Na_{1.7}Ti_{5.7}Nb_{0.3}O_{14}$.

Example 2

In Example 2, an active material of Example 2 was obtained by the procedure similar to that in Example 1 except that when raw materials were mixed, a powder of titanium dioxide $TiO_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb in a mixture was 2:1.9:5.9:0.1.

A portion of the active material of Example 2 was subjected to ICP analysis, XRD measurement, and SEM observation, each of which is described above. As a result, it was found that the active material of Example 2 included particles of an orthorhombic composite oxide having a composition of $Li_2Na_{1.9}Ti_{5.9}Nb_{0.1}O_{14}$.

Example 3

In Example 3, an active material of Example 3 was obtained by the procedure similar to that in Example 1 except that when raw materials were mixed, a powder of titanium dioxide $TiO_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb in a mixture was 2.1:1.8:5.9:0.1.

A portion of the active material of Example 3 was subjected to ICP analysis, XRD measurement, and SEM observation, each of which is described above. As a result, it was found that the active material of Example 3 included particles of orthorhombic composite oxide having a composition of $Li_{2.1}Na_{1.8}Ti_{5.9}Nb_{0.1}O_{14}$.

Example 4

In Example 4, an active material of Example 4 was obtained by the procedure similar to that in Example 1 except that when raw materials were mixed, a powder of titanium dioxide $TiO_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb in a mixture was 2:1.5:5.5:0.5.

A portion of the active material of Example 4 was subjected to ICP analysis, XRD measurement, and SEM observation, each of which is described above. As a result, it was found that the active material of Example 4 included particles of an orthorhombic composite oxide having a composition $Li_2Na_{1.5}Ti_{5.5}Nb_{0.5}O_{14}$.

Example 5

In Example 5, an active material of Example 5 was obtained by the procedure similar to that in Example 1 except that when raw materials were mixed, a powder of titanium dioxide $TiO_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb in a mixture was 2.2:1.4:5.5:0.5.

A portion of the active material of Example 5 was subjected to ICP analysis, XRD measurement, and SEM observation, each of which is described above. As a result, it was found that the active material of Example 5 included particles of an orthorhombic composite oxide having a composition of $Li_{2.2}Na_{1.4}Ti_{5.5}Nb_{0.5}O_{14}$.

Example 6

In Example 6, an active material of Example 6 was obtained by the procedure similar to that in Example 1 except that when raw materials were mixed, a powder of titanium dioxide $TiO_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb in a mixture was 2:1:5:1.

A portion of the active material of Example 6 was subjected to ICP analysis, XRD measurement, and SEM observation, each of which is described above. As a result, it was found that the active material of Example 6 included particles of an orthorhombic composite oxide having a composition of $Li_2NaTi_5NbO_{14}$.

Example 7

In Example 7, an active material of Example 7 was obtained by the procedure similar to that in Example 1 except that a powder of strontium nitrate $Sr(NO_3)_2$ was further used as a raw material, and when raw materials were mixed, a powder of titanium dioxide $TiO_2$, the powder of strontium nitrate $Sr(NO_3)_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Sr:Ti:Nb in a mixture was 2:1:0.5:5.9:0.1.

A portion of the active material of Example 7 was subjected to ICP analysis, XRD measurement, and SEM observation, which is described above. As a result, it was found that the active material of Example 7 included particles of an orthorhombic composite oxide having a composition $Li_2NaSr_{0.5}Ti_{5.9}Nb_{0.1}O_{14}$.

Example 8

In Example 8, an active material of Example 8 was obtained by the procedure similar to that in Example 7 except that when raw materials were mixed, a powder of titanium dioxide $TiO_2$, a powder of strontium nitrate $Sr(NO_3)_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Sr:Ti:Nb in a mixture was 2:1.5:0.2:5.9:0.1.

A portion of the active material of Example 8 was subjected to ICP analysis, XRD measurement, and SEM observation, each of which is described above. As a result, it was found that the active material of Example 8 included particles of an orthorhombic composite oxide having a composition $Li_2Na_{1.5}Sr_{0.2}Ti_{5.9}Nb_{0.1}O_{14}$.

Example 9

In Example 9, an active material of Example 9 was obtained by the procedure similar to that in Example 1 except that a powder of magnesium acetate $Mg(CH_3COO)_2$ was further used as a raw material, and when raw materials were mixed, a powder of titanium dioxide $TiO_2$, the powder of magnesium acetate $Mg(CH_3COO)_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Mg:Ti:Nb in a mixture was 2:1.5:0.2:5.9:0.1.

A portion of the active material of Example 9 was subjected to ICP analysis, XRD measurement, and SEM observation, each of which is described above. As a result, it was found that the active material of Example 9 included particles of an orthorhombic composite oxide having a composition of $Li_2Na_{1.5}Mg_{0.2}Ti_{5.9}Nb_{0.1}O_{14}$.

Example 10

In Example 10, an active material of Example 10 was obtained by the procedure similar to that in Example 1 except that a powder of barium carbonate $BaCO_3$ was further used as a raw material, and when raw materials were mixed, a powder of titanium dioxide $TiO_2$, the powder of barium carbonate $BaCO_3$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ba:Ti:Nb in a mixture was 2:1.5:0.2:5.9:0.1.

A portion of the active material of Example 10 was subjected to ICP analysis, XRD measurement, and SEM observation, each of which is described above. As a result, it was found that the active material of Example 10 included particles of an orthorhombic composite oxide having a composition of $Li_2Na_{1.5}Ba_{0.2}Ti_{5.9}Nb_{0.1}O_{14}$.

Example 11

In Example 11, an active material of Example 11 was obtained by the procedure similar to that in Example 10 except that when raw materials were mixed, a powder of titanium dioxide $TiO_2$, a powder of barium carbonate $BaCO_3$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ba:Ti:Nb in a mixture was 2:1.5:0.2:5.5:0.5.

A portion of the active material of Example 11 was subjected to ICP analysis, XRD measurement, and SEM observation, each of which is described above. As a result, it was found that the active material of Example 11 included particles of an orthorhombic composite oxide having a composition of $Li_2Na_{1.5}Ba_{0.2}Ti_{5.5}Nb_{0.5}O_{14}$.

Example 12

In Example 12, an active material of Example 12 was obtained by the procedure similar to that in Example 1 except that a powder of aluminum oxide $Al_2O_3$ was further used as a raw material, and when raw materials were mixed, a powder of titanium dioxide $TiO_2$, the powder of aluminum oxide $Al_2O_3$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb:Al in a mixture was 2:1.9:5.7:0.1:0.2.

A portion of the active material of Example 12 was subjected to ICP analysis, XRD measurement, and SEM observation, each of which is described above. As a result, it was found that the active material of Example 12 included particles of an orthorhombic composite oxide having a composition of $Li_2Na_{1.9}Ti_{5.7}Nb_{0.1}Al_{0.2}O_{14}$.

Example 13

In Example 13, an active material of Example 13 was obtained by the procedure similar to that in Example 1 except that a powder of zirconium oxide $ZrO_2$ was further used as a raw material, and when raw materials were mixed, a powder of titanium dioxide $TiO_2$, a powder of zirconium oxide $ZrO_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb:Zr in a mixture was 2:1.9:5.8:0.1:0.1.

A portion of the active material of Example 13 was subjected to ICP analysis, XRD measurement, and SEM observation, each of which is described above. As a result, it was found that the active material of Example 13 included particles of an orthorhombic composite oxide having a composition of $Li_2Na_{1.9}Ti_{5.8}Nb_{0.1}Zr_{0.1}O_{14}$.

Example 14

In Example 14, an active material of Example 14 was obtained by the procedure similar to that in Example 1 except that a powder of tin oxide $SnO_2$ was used as a raw material, and when raw materials were mixed, a powder of titanium dioxide $TiO_2$, the powder of tin oxide $SnO_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb:Sn in a mixture was 2:1.9:5.8:0.1:0.1.

A portion of the active material of Example 14 was subjected to ICP analysis, XRD measurement, and SEM observation, each of which is described above. As a result, it was found that the active material of Example 14 included particles of an orthorhombic composite oxide having a composition of $Li_2Na_{1.9}Ti_{5.8}Nb_{0.1}Sn_{0.1}O_{14}$.

Example 15

In Example 15, an active material of Example 15 was obtained by the procedure similar to that in Example 1 except that a powder of tantalum (V) oxide $Ta_2O_5$ was further used as a raw material, and when raw materials were mixed, a powder of titanium dioxide $TiO_2$, the powder of tantalum (V) oxide $Ta_2O_5$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb:Ta in a mixture was 2.1:1.9:5.8:0.1:0.1.

A portion of the active material of Example 15 was subjected to ICP analysis, XRD measurement, and SEM observation described above. As a result, it was found that the active material of Example 15 contained particles of orthorhombic composite oxide having a composition $Li_2Na_{1.9}Ti_{5.8}Nb_{0.1}Ta_{0.1}O_{14}$.

Example 16

In Example 16, an active material of Example 16 was obtained by the procedure similar to that in Example 1 except that a powder of vanadium (V) oxide $V_2O_5$ was further used as a raw material, and when raw materials were mixed, a powder of titanium dioxide $TiO_2$, the powder of vanadium (V) oxide $V_2O_5$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb:V in a mixture was 2.1:1.9:5.8:0.1:0.1.

A portion of the active material of Example 16 was subjected to ICP analysis, XRD measurement, and SEM observation, each of which is described above. As a result, it was found that the active material of Example 16 included particles of orthorhombic composite oxide having a composition of $Li_{2.1}Na_{1.9}Ti_{5.8}Nb_{0.1}V_{0.1}O_{14}$.

Example 17

In Example 17, an active material of Example 17 was obtained by the procedure similar to that in Example 1 except that a powder of iron (III) oxide $Fe_2O_3$ was further used as a raw material, and when raw materials were mixed, a powder of titanium dioxide $TiO_2$, the powder of iron (III) oxide $Fe_2O_3$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb:Fe in a mixture was 2:1.9:5.8:0.1:0.1.

A portion of the active material of Example 17 was subjected to ICP analysis, XRD measurement, and SEM observation, each of which is described above. As a result, it was found that the active material of Example 17 included particles of an orthorhombic composite oxide having a composition of $Li_2Na_{1.9}Ti_{5.8}Nb_{0.1}Fe_{0.1}O_{14}$.

Example 18

In Example 18, an active material of Example 18 was obtained by the procedure similar to that in Example 1 except that a powder of cobalt oxide $Co_3O_4$ was further used as a raw material, and when raw materials were mixed, a powder of titanium dioxide $TiO_2$, the powder of cobalt oxide $Co_3O_4$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb:Co in a mixture was 2:1.9:5.8:0.1:0.1.

A portion of the active material of Example 18 was subjected to ICP analysis, XRD measurement, and SEM observation, each of which is described above. As a result, it was found that the active material of Example 18 included particles of an orthorhombic composite oxide having a composition of $Li_2Na_{1.9}Ti_{5.8}Nb_{0.1}Co_{0.1}O_{14}$.

Example 19

In Example 19, an active material of Example 19 was obtained by the procedure similar to that in Example 1 except that a powder of manganese oxide $Mn_3O_4$ was further used as a raw material, and when raw materials were mixed, a powder of titanium dioxide $TiO_2$, the powder of manganese oxide $Mn_3O_4$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb:Mn in a mixture was 2:1.9:5.8:0.1:0.1.

A portion of the active material of Example 19 was subjected to ICP analysis, XRD measurement, and SEM observation, each of which is described above. As a result, it was found that the active material of Example 19 included particles of an orthorhombic composite oxide having a composition of $Li_2Na_{1.9}Ti_{5.8}Nb_{0.1}Mn_{0.1}O_{14}$.

Example 20

In Example 20, an active material of Example 20 was obtained by the procedure similar to that in Example 1 except that a powder of molybdenum oxide $MoO_3$ was further used as a raw material, and when raw materials were mixed, a powder of titanium dioxide $TiO_2$, the powder of molybdenum oxide $MoO_3$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb:Mo in a mixture was 2:1.9:5.8:0.1:0.1.

A portion of the active material of Example 20 was subjected to ICP analysis, XRD measurement, and SEM observation, each of which is described above. As a result, it was found that the active material of Example 20 included particles of an orthorhombic composite oxide having a composition of $Li_2Na_{1.9}Ti_{5.8}Nb_{0.1}Mo_{0.1}O_{14}$.

Comparative Example 1

In Comparative Example 1, an active material of Comparative Example 1 was obtained by the following procedure.

First, as raw materials, a powder of titanium oxide $TiO_2$, a powder of lithium carbonate $Li_2CO_3$, a powder of sodium carbonate $Na_2CO_3$, and a powder of niobium (V) hydroxide $Nb(OH)_5$ were provided. Those raw materials were mixed such that the molar ratio of Li:Na:Ti:Nb in a mixture was 2:1.7:5.7:0.3. The average particle size of the raw materials was 12 μm.

Next, a mixture of the raw materials was subjected to a first heat treatment at 900° C. for 3 hours in the air atmosphere. Thus, a powder of a product was obtained. The product powder was defined as the active material of Comparative Example 1.

A portion of the active material of Comparative Example 1 was subjected to ICP analysis, XRD measurement, and SEM observation, each of which is described above. As a result, it was found that the active material of Comparative Example 1 included particles of an orthorhombic composite oxide having a composition of $Li_2Na_{1.7}Ti_{5.7}Nb_{0.3}O_{14}$.

Comparative Example 2

In Comparative Example 2, an active material of Comparative Example 2 was obtained by the following procedure.

First, as raw materials, a powder of titanium oxide $TiO_2$, a powder of lithium carbonate $Li_2CO_3$, a powder of sodium carbonate $Na_2CO_3$, and a powder of niobium (V) hydroxide $Nb(OH)_5$ were provided. Those raw materials were mixed such that the molar ratio of Li:Na:Ti:Nb in a mixture was 2:1.5:5.5:0.5. The average particle size of the raw materials was 14 μm.

Next, a mixture of the raw materials was subjected to a first heat treatment at 900° C. for 3 hours in the air atmosphere. Thus, a powder of a product was obtained. The product powder was defined as the active material of Comparative Example 2.

A portion of the active material of Comparative Example 2 was subjected to ICP analysis, XRD measurement, and SEM observation, each of which is described above. As a result, it was found that the active material of Comparative Example 2 included particles of an orthorhombic composite oxide having a composition of $Li_2Na_{1.5}Ti_{5.5}Nb_{0.5}O_{14}$.

Comparative Example 3

In Comparative Example 3, an active material of Comparative Example 3 was obtained by the following procedure.

First, as raw materials, a powder of titanium oxide $TiO_2$, a powder of lithium carbonate $Li_2CO_3$, a powder of sodium carbonate $Na_2CO_3$, and a powder of niobium (V) hydroxide $Nb(OH)_5$ were provided. These raw materials were mixed such that the molar ratio of Li:Na:Ti:Nb in a mixture was 2:1:5:1. The average particle size of the raw materials was 15 μm.

Next, a mixture of the raw materials was subjected to a first heat treatment at 1100° C. for 3 hours in the air atmosphere. Thus, a powder of a product was obtained. The product powder was defined as the active material of Comparative Example 3.

A portion of the active material of Comparative Example 3 was subjected to ICP analysis, XRD measurement, and SEM observation, each of which is described above. As a result, it was found that the active material of Comparative Example 3 included particles of an orthorhombic composite oxide having a composition of $Li_2NaTi_5NbO_{14}$.

Comparative Example 4

In Comparative Example 4, an active material of Comparative Example 4 was obtained by the following procedure.

First, as raw materials, a powder of titanium oxide $TiO_2$, a powder of lithium carbonate $Li_2CO_3$, a powder of sodium carbonate $Na_2CO_3$, and a powder of niobium (V) hydroxide $Nb(OH)_5$ were provided. Those raw materials were mixed such that the molar ratio of Li:Na:Ti:Nb in a mixture was 2.1:1.7:5.7:0.3. The average particle size of the raw materials was 12 μm.

Next, a mixture of the raw materials was subjected to a first heat treatment at 900° C. for 3 hours in the air atmosphere. Thus, a powder of a product was obtained. The product powder was defined as the active material of Comparative Example 4.

A portion of the active material of Comparative Example 4 was subjected to ICP analysis, XRD measurement, and SEM observation, each of described above. As a result, it was found that the active material of Comparative Example 4 included particles of an orthorhombic composite oxide having a composition of $Li_{2.1}Na_{1.7}Ti_{5.7}Nb_{0.3}O_{14}$.

Comparative Example 5

In Comparative Example 5, an active material of Comparative Example 5 was obtained by the following procedure.

First, as raw materials, a powder of titanium oxide $TiO_2$, a powder of lithium carbonate $Li_2CO_3$, a powder of sodium carbonate $Na_2CO_3$, and a powder of niobium (V) hydroxide $Nb(OH)_5$ were provided. Those raw materials were mixed such that the molar ratio of Li:Na:Ti:Nb in a mixture was 2.1:1.7:5.7:0.3. The average particle size of the raw materials was 12 μm.

Next, a mixture of the raw materials was subjected to a first heat treatment at 1100° C. for 3 hours in the atmosphere. Thus, a powder of a product was obtained. The product powder was employed as the active material of Comparative Example 5.

A portion of the active material of Comparative Example 5 was subjected to ICP analysis, XRD measurement, and SEM observation, each of which is described above. As a result, it was found that the active material of Comparative Example 5 included particles of an orthorhombic composite oxide having a composition of $Li_{2.1}Na_{1.7}Ti_{5.7}Nb_{0.3}O_{14}$.

[Diffuse FT-IR Measurement]

The active materials of Examples 1 to 20 and Comparative Examples 1 to 5 were subjected to the diffuse FT-IR measurement described above.

As a measurement apparatus, Varian 7000 (manufactured by Varian, Inc.) equipped with a diffuse reflection measuring device (manufactured by PIKE Technologies Co.) was used.

The spectrum (1) shown in FIG. 1 is the spectrum of Example 4. The spectrum (2) shown in FIG. 1 is the spectrum of Comparative Example 2.

[Production of Electrode]

Electrode of each of Examples 1 to 20 and Comparative Examples 1 to 5 was produced by the following procedure, using each of the active materials of Examples 1 to 20 and Comparative Examples 1 to 5. In the following description, as a representative example, a procedure for producing the electrode of Example 1 will be described. The electrode of each of Examples 2 to 20 and Comparative Examples 1 to 5 were produced by the procedure similar to that in the electrode of Example 1.

First, a powder of the active material of Example 1, acetylene black as a conductive agent, and polyvinylidene fluoride (PVdF) as a binder were provided. They were added to N-methylpyrrolidone (NMP) as a solvent and mixed such that a weight ratio of the active material:acetylene black: PVdF was 90% by weight:5% by weight:5% by weight, thus obtaining a mixture.

Next, the obtained mixture was stirred using a rotation/revolution mixer to prepare a slurry. The slurry was applied onto both surfaces of a current collector formed of an aluminum foil having a thickness of 15 μm, and the coated films was dried. Next, the dried coated films were pressed. Thus, the electrode of Example 1 having an electrode density (including no current collector) of 2.3 g/cm³ was produced.

[Production of Cell for Electrode Evaluation]

Next, a cell for electrode evaluation of each of Examples 1 to 20 and Comparative Examples 1 to 5 was produced using each of the electrodes of Examples 1 to 20 and Comparative Examples 1 to 5. In the following description, as a representative example, a procedure for producing the cell for electrode evaluation of Example 1 will be described. The cell for electrode evaluation of each of Examples 2 to 20 and Comparative Examples 1 to 5 was produced by the procedure similar to that in the cell for electrode evaluation of Example 1.

The cell for electrode evaluation of Example 1 was produced in dry argon by the following procedure. The electrode of Example 1 was used as a working electrode, and Li metal was used as a counter electrode. Those electrodes were arranged to face each other through a glass filter (separator), and a reference electrode formed of lithium metal was inserted so as not to be in contact with the working electrode and the counter electrode. The above members were placed in a three-pole glass cell, and the working electrode, the counter electrode, and the reference electrode were respectively connected to terminals of the glass cell.

Next, a liquid electrolyte was poured into the glass cell to achieve a state in which the separator and the electrodes were satisfactorily impregnated with the liquid electrolyte. The glass cell was sealed in that state. As the liquid electrolyte, a liquid electrolyte prepared by dissolving $LiPF_6$ at a concentration of 1.0 mol/L in a mixed solvent was used. As a solvent of the liquid electrolyte, a mixed solvent prepared by mixing ethylene carbonate (EC) with diethyl carbonate (DEC) at a volume ratio of 1:2 was used.

<Charge-and-Discharge Test for Cell for Electrode Evaluation>

Each cell for electrode evaluation was subjected to a charge-and-discharge test by the following procedure. The test environment was a 25° C. environment. A current value 1 C was 120 mA/g (a current value per weight of the active material).

First, each cell for electrode evaluation was subjected to constant-current charge at the current value 1 C until the potential of a working electrode reached 1.1 V (vs. Li/Li⁺).

Subsequently, each cell for electrode evaluation was subjected to constant-voltage charge until the current value reached 0.05 C. Namely, charge was performed in a constant-current/constant-voltage mode.

Next, each cell for electrode evaluation was discharged. Discharging herein was performed in a constant current mode of 0.2 C, and a discharge terminal potential was 2.0 V (vs. Li/Li$^+$). A discharge capacity in the charge-and-discharge test for each cell for electrode evaluation is shown in Table 1 below as a 0.2 C discharge capacity.

TABLE 1

|  | $I_1$ | $I_2$ | 0.2 C Discharge Capacity (mAh/g) |
| --- | --- | --- | --- |
| Example 1 | 1.4 | 7 | 128 |
| Example 2 | 1.4 | 9 | 127 |
| Example 3 | 1.6 | 10 | 128 |
| Example 4 | 1.5 | 7 | 130 |
| Example 5 | 1.6 | 10 | 129 |
| Example 6 | 1.2 | 5 | 123 |
| Example 7 | 1 | 6 | 127 |
| Example 8 | 1.3 | 8 | 130 |
| Example 9 | 1.4 | 8 | 129 |
| Example 10 | 1.5 | 7 | 127 |
| Example 11 | 1.2 | 7 | 129 |
| Example 12 | 1.4 | 8 | 126 |
| Example 13 | 1.3 | 9 | 125 |
| Example 14 | 1.3 | 8 | 125 |
| Example 15 | 1.6 | 14 | 126 |
| Example 16 | 1.6 | 13 | 127 |
| Example 17 | 1.4 | 8 | 125 |
| Example 18 | 1.3 | 7 | 124 |
| Example 19 | 1.4 | 8 | 125 |
| Example 20 | 1.4 | 8 | 127 |
| Comparative Example 1 | 2.5 | 22 | 116 |
| Comparative Example 2 | 2.2 | 19 | 120 |
| Comparative Example 3 | 1.8 | 15 | 113 |
| Comparative Example 4 | 2.7 | 24 | 112 |
| Comparative Example 5 | 2 | 22 | 114 |

The 0.2 C discharge capacity obtained by the above-described charge-and-discharge test shows the electric quantity capable of being discharged under the same condition by each cell for electrode evaluation charged with a similar electric quantity. Namely, the 0.2 C discharge capacity for each cell for electrode evaluation shown in Table 1 is an index of the reversible capacity of each active material.

As seen in Table 1, in the active materials of Examples 1 to 20, in the infrared diffuse reflectivity spectrum for a surface of particles of Na-containing niobium titanium composite oxide, the intensity $I_1$ of the strongest peak $P_1$ within the range of 3350 to 3450 cm$^{-1}$ was not more than 1.6.

It is considered that this was because the raw materials were satisfactorily ground before being mixed and thereby easily reacted in the first heat treatment, and ball mill grinding was performed in an aqueous solution after the first heat treatment, whereby the amount of hydroxide or carbonate of lithium and/or sodium, that may be produced at a grain boundary or on a particle surface of the product obtained by the first heat treatment, could be reduced.

As shown in FIG. 1 and Table 1, for example, in the active material of Example 4, raw materials similar to those in Comparative Example 2 were used. The intensity $I_1$ of the strongest peak $P_1$ for a surface of particles of composite oxide included in the active material of Example 4 was lower than that in Comparative Example 2.

Furthermore, as shown in Table 1, the active materials of Examples 1 to 20 could exhibit higher reversible capacities than Comparative Examples 1 to 5 in which the intensity $I_1$ of the strongest peak $P_1$ was more than 1.6.

It can be assumed that, in each the active materials of Comparative Examples 1 to 5, since the intensity $I_1$ of the strongest peak $P_1$ was more than 1.6, a hydroxyl group was excessively present on a surface of particles of the composite oxide. As a result, It is considered that, in Comparative Examples 1 to 5, the reversible capacity that could be achieved was low.

The intensity $I_2$ of the strongest peak $P_2$ for a surface of particles of the composite oxide included in the active material of Example 5 was 10, and the intensities $1_2$ in Examples 15 and 16 were 14 and 13, respectively. In Example 5 and Examples 15 and 16, the Li amount was 2.1 moles per 1 mole of composite oxide, and namely, the Li amounts were equal to each other. However, it is considered that in Examples 15 and 16 in which the intensity $I_2$ of the strongest peak $P_2$ was high, the amount of carbonate on the particle surface was large as compared with Example 5. As a result, in the active material of Example 5, the reversible capacity was 129 mAh/g, and the reversible capacities of Examples 15 and 16 were 126 and 127 mAh/g, respectively. This result shows that the intensity $I_2$ is preferably 10 or less.

Example 21

In Example 21, an active material of Example 21 was obtained by the following procedure.

First, as raw materials, a powder of titanium oxide $TiO_2$, a powder of lithium carbonate $Li_2CO_3$, a powder of sodium carbonate $Na_2CO_3$, and a powder of niobium (V) hydroxide $Nb(OH)_5$ were provided. Those raw materials were mixed such that the molar ratio of Li:Na:Ti:Nb in a mixture was 2:1.7:5.7:0.3. Prior to mixing, the raw materials were satisfactorily ground such that an average particle size of the raw materials was 5 µm or less.

Next, a mixture of the raw materials was subjected to a first heat treatment at 900° C. for 3 hours in the air atmosphere. Thus, a powder of a product was obtained.

A portion of the product was subjected to ICP analysis, XRD measurement, and SEM observation, each of which is described above. As a result, it was found that the product included particles of an orthorhombic composite oxide having a composition of $Li_2Na_{1.7}Ti_{5.7}Nb_{0.3}O_{14}$.

Next, a powder of composite oxide $Li_2Na_{1.7}Ti_{5.7}Nb_{0.3}O_{14}$ and a powder of oxidized aluminum $Al_2O_3$ were dry-blended at a weight ratio of 100:1.

Next, the obtained mixture was subjected to a second heat treatment at 700° C. for 1 hour in the atmosphere. Thus, the active material of Example 21 was obtained.

A portion of the active material of Example 21 was subjected to ICP analysis, XRD measurement, and SEM observation, each of which is described above. As a result, it was found that the active material of Example 21 included particles of an orthorhombic composite oxide having a composition of $Li_2Na_{1.7}Ti_{5.7}Nb_{0.3}O_{14}$. It is assumed that Al is present as a composite oxide produced by reacting with any of elements Li, Na, Ti, and Nb contained in $Li_2Na_{1.7}Ti_{5.7}Nb_{0.3}O_{14}$ particles on the surface of the particles, or is present as $Al_2O_3$ on the particle surface of $Li_2Na_{1.7}Ti_{5.7}Nb_{0.3}O_{14}$.

Example 22

In Example 22, an active material of Example 22 was obtained under the conditions similar to Example 21 except that a powder of composite oxide $Li_2Na_{1.7}Ti_{5.7}Nb_{0.3}O_{14}$ and a powder of zirconium oxide $ZrO_2$ were dry-blended at a weight ratio of 100:1.

A portion of the active material of Example 22 was subjected to ICP analysis, XRD measurement, and SEM observation, each of which is described above. As a result, it was found that the active material of Example 22 included particles of an orthorhombic composite oxide having a composition of $Li_2Na_{1.7}Ti_{5.7}Nb_{0.3}O_{14}$. It is assumed that Zr is present as a composite oxide produced by reacting with any of elements Li, Na, Ti, and Nb contained in $Li_2Na_{1.7}Ti_{5.7}Nb_{0.3}O_{14}$ particles on the surface of the particles or is present as $ZrO_2$ on the particle surface of $Li_2Na_{1.7}Ti_{5.7}Nb_{0.3}O_{14}$.

Example 23

In Example 23, an active material of Example 23 was obtained under the conditions similar to Example 21 except that a powder of composite oxide $Li_2Na_{1.7}Ti_{5.7}Nb_{0.3}O_{14}$ and a powder of magnesium oxide MgO were dry-blended at a weight ratio of 100:1.

A portion of the active material of Example 23 was subjected to ICP analysis, XRD measurement, and SEM observation, each of which is described above. As a result, it was found that the active material of Example 23 included particles of an orthorhombic composite oxide having a composition of $Li_2Na_{1.7}Ti_{5.7}Nb_{0.3}O_{14}$. It is assumed that Mg is present as a composite oxide produced by reacting with any of elements Li, Na, Ti, and Nb contained in $Li_2Na_{1.7}Ti_{5.7}Nb_{0.3}O_{14}$ particles on the surface of the particles or is present as MgO on the particle surface of $Li_2Na_{1.7}Ti_{5.7}Nb_{0.3}O_{14}$.

The active materials of Examples 21 to 23 were subjected to diffuse FT-IR measurement described above. Cell for electrode evaluation of each of Examples 21 to 23 was produced by the procedure similar to that in Example 1 except that each of the active materials of Examples 21 to 23 were used. The produced cells for electrode evaluation of Examples 21 to 23 were subjected to the charge-and-discharge test as in Example 1. Those results are shown in Table 2 below.

TABLE 2

|  | $I_1$ | $I_2$ | 0.2 C Discharge Capacity (mAh/g) |
|---|---|---|---|
| Example 21 | 1.4 | 8 | 127 |
| Example 22 | 1.3 | 8 | 128 |
| Example 23 | 1.2 | 7 | 128 |

As shown in Table 2, in each of the active materials of Examples 21 to 23, as in the active materials of Examples 1 to 20, in the infrared diffuse reflectivity spectrum for a surface of particles of the Na-containing niobium titanium composite oxide, the intensity $I_1$ of the strongest peak $P_1$ within the range of 3350 to 3450 $cm^{-1}$ was not more than 1.6. As seen in Tables 1 and 2, the active materials of Examples 21 to 23 could exhibit higher reversible capacities than Comparative Examples 1 to 5 in which the intensity $I_1$ of the strongest peak $P_1$ was more than 1.6.

Comparative Example 6

In Comparative Example 6, an active material of Comparative Example 6 was obtained by the following procedure.

First, as raw materials, a powder of titanium oxide $TiO_2$ and a powder of lithium carbonate $Li_2CO_3$ were provided. Those raw materials were mixed such that the molar ratio of Li:Ti in a mixture was 4:5. The raw materials were satisfactorily ground such that an average particle size of the raw materials was 5 μm or less. The ground raw materials were subjected to a heat treatment at 900° C. for 3 hours in the air atmosphere. Thus, the active material of Comparative Example 6 was obtained.

A portion of the active material of Comparative Example 6 was subjected to ICP analysis, XRD measurement, and SEM observation, each of which described above. As a result, it was found that the active material of Comparative Example 6 included particles of a spinel-type lithium titanate having a composition of $Li_4Ti_5O_{12}$.

Comparative Example 7

In Comparative Example 7, an active material of Comparative Example 7 was obtained by the following procedure.

First, as raw materials, a powder of titanium oxide $TiO_2$ and a powder of lithium carbonate $Li_2CO_3$ were provided. Those raw materials were mixed such that the molar ratio of Li:Ti in a mixture was 4:5. The average particle size of the raw materials was 13 μm. A mixture of the raw materials having that average particle diameter was subjected to heat treatment at 900° C. for 3 hours in the air atmosphere. Thus, the active material of Comparative Example 7 was obtained.

A portion of the active material of Comparative Example 7 was subjected to ICP analysis, XRD measurement, and SEM observation, each of which is described above. As a result, it was found that the active material of Comparative Example 7 included particles of a spinel-type lithium titanate having a composition of $Li_4Ti_5O_{12}$.

Comparative Example 8

In Comparative Example 8, an active material of Comparative Example 8 was obtained by the following procedure.

First, as a starting raw material, a powder of $K_2Ti_4O_9$ was provided. The powder of $K_2Ti_4O_9$ was washed with distilled water. Next, the powder of $K_2Ti_4O_9$ was subjected to an acid treatment. In the acid treatment, hydrochloric acid having a concentration of 1 M was used, and the acid treatment temperature was 25° C. The acid treatment time was 14 days. By the acid treatment, potassium of $K_2Ti_4O_9$ was exchanged for a proton, thus obtaining a proton-exchanged product $H_2Ti_4O_9$.

Next, the proton-exchanged product was dried to obtain a $TiO_2(B)$ precursor. The obtained $TiO_2(B)$ precursor was subjected to a heat treatment at 350° C. for 1 hour, whereby the active material of Comparative Example 8 was obtained.

A portion of the active material of Comparative Example 8 was subjected to ICP analysis, XRD measurement, and SEM observation, each of which is described above. As a result, it was found that the active material of Comparative Example 8 included particles of $TiO_2(B)$.

The active materials of Comparative Examples 6 to 8 were subjected to diffuse FT-IR measurement described above. A cell for electrode evaluation of each of Comparative Examples 6 to 8 was produced by the procedure similar to that in Example 1 except that each of active materials of Comparative Examples 6 to 8 was used. The produced cells for electrode evaluation of Comparative Examples 6 to 8 were subjected to the charge-and-discharge test as in Example 1. Those results are shown in Table 3 below. The 0.2 C discharge capacity was shown in Table 3 below by a relative value in the case of setting a value of Comparative Example 6 to be 100.

TABLE 3

|  | $I_1$ | $I_2$ | 0.2 C Discharge Capacity (Relative Value) |
| --- | --- | --- | --- |
| Comparative Example 6 | 1.1 | — | 1 |
| Comparative Example 7 | 1.8 | — | 0.99 |
| Comparative Example 8 | 2.5 | — | 1.46 |

The results of Comparative Examples 6 and 7 show that the reversible capacity of lithium titanate does not depend on the value of the intensity $I_1$ of the strongest peak $P_1$ within the range of 3350 to 3450 cm$^{-1}$ in the infrared diffuse reflectivity spectrum for a particle surface. Further, the results of Comparative Example 8 show that TiO$_2$(B) can exhibit high reversible capacity even if the intensity $I_1$ of the strongest peak $P_1$ is more than 1.6. Namely, it is found that the reversible capacity of TiO$_2$(B) does not depend on the value of the intensity $I_1$ of the strongest peak $P_1$. For TiO$_2$(B) of Comparative Example 8, since the number of surface hydroxyl groups is large, it is considered that $I_1$ exhibits a high value. Should be noted that in lithium titanate and TiO$_2$(B), infrared light having a wave number of 1400 cm$^{-1}$ or less was less likely to transmit, therefore, the peak intensity $I_2$ could not be measured.

As described above, the active materials of Examples 1 to 23 can exhibit high reversible capacity. Accordingly, by virtue of the use of a negative electrode produced using each of those active materials, a nonaqueous electrolyte battery which can exhibit high reversible capacity can be produced.

Furthermore, a nonaqueous electrolyte battery produced by combining each of the electrodes of Examples 1 to 23 and a positive electrode produced using a lithium cobalt composite oxide can exhibit excellent rate characteristics. A nonaqueous electrolyte battery produced by combining each of the electrodes of Examples 1 to 23 and a positive electrode produced using a lithium nickel cobalt manganese composite oxide can exhibit higher energy density and more excellent cycle life characteristics. A nonaqueous electrolyte battery produced by combining each of the electrodes of Examples 1 to 23 and a positive electrode produced using a spinel-type lithium manganese composite oxide can exhibit more excellent cycle life characteristics and more excellent rate characteristics. A nonaqueous electrolyte battery produced by combining each of the electrodes of Examples 1 to 23 and a positive electrode produced using an olivine-type lithium manganese iron composite phosphate can exhibit excellent cycle life characteristics, particularly at high temperature.

According to one or more embodiments and Examples described above, an active material including particles of a Na-containing niobium titanium composite oxide having an orthorhombic crystal structure is provided. In the infrared diffuse reflectivity spectrum obtained by diffuse reflectance infrared Fourier transform spectrometry measurement for a surface of the particles of the Na-containing niobium titanium composite oxide, the peak intensity $I_1$ of the strongest peak $P_1$ within the range of 3350 to 3450 cm$^{-1}$ is 1.6 or less. By including such a composite oxide, the active material according to the first embodiment can achieve a nonaqueous electrolyte battery which can exhibit high reversible capacity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising particles of a Na-containing niobium titanium composite oxide having an orthorhombic crystal structure,
   wherein a peak intensity $I_1$ of a strongest peak $P_1$ within a range of 3350 to 3450 cm$^{-1}$ is 1.6 or less in an infrared diffuse reflectivity spectrum of a surface of the particles, according to a diffuse reflectance Fourier transform spectrometry measurement, and
   wherein the Na-containing niobium titanium composite oxide is represented by a general formula of:

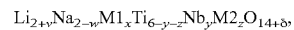

$Li_{2+v}Na_{2-w}M1_xTi_{6-y-z}Nb_yM2_zO_{14+\delta}$, wherein:
   $0 \leq v \leq 0.2$;
   $0 < w < 2$;
   $0.05 \leq x \leq 0.2$;
   $0 < y < 6$;
   $0 \leq z < 3$;
   $-0.5 \leq \delta \leq 0.5$;
   M1 is at least one metal element selected from the group consisting of Cs, K, Mg, Sr, Ba and Ca; and
   M2 is at least one metal element selected from the group consisting of Zr, Sn, V, Ta, Mo, W, Fe, Co, Mn, and Al.

2. The active material according to claim 1, wherein, in the infrared diffuse reflectivity spectrum, a peak intensity $I_2$ of a strongest peak $P_2$ within a range of 1410 to 1460 cm$^{-1}$ is within a range of $6 \leq I_2 \leq 10$.

3. The active material according to claim 1, wherein the peak intensity $I_1$ of the strongest peak $P_1$ is within a range of 1 or more and 1.6 or less.

4. The active material according to claim 1, wherein the peak intensity $I_1$ of the strongest peak $P_1$ is within a range of 1.2 or more and 1.5 or less.

5. The active material according to claim 1, wherein a value of y is within a range of $0.1 \leq y \leq 1$.

6. The active material according to claim 1, wherein a value of w is within a range of $0.1 \leq w \leq 1$.

7. A nonaqueous electrolyte battery comprising:
   a negative electrode comprising the active material according to claim 1;
   a positive electrode; and
   a nonaqueous electrolyte.

8. The nonaqueous electrolyte battery according to claim 7, wherein the positive electrode comprises at least one selected from the group consisting of a lithium cobalt composite oxide, a lithium nickel cobalt manganese composite oxide, a lithium manganese composite oxide having a spinel structure, and a lithium manganese iron composite phosphate having an olivine structure.

9. A battery pack comprising the nonaqueous electrolyte battery according to claim 7.

10. The battery pack according to claim 9, further comprising:
an external power distribution terminal, and
a protective circuit.

11. A battery pack comprising nonaqueous electrolyte batteries each according to claim 7, wherein the nonaqueous electrolyte batteries are electrically connected in series, in parallel, or in combination of series and parallel.

12. A vehicle comprising the battery pack according to claim 9.

13. The vehicle according to claim 12, wherein the battery pack is configured to recover a regenerative energy of a power of the vehicle.

* * * * *